US012293386B2

(12) United States Patent
Gourley et al.

(10) Patent No.: US 12,293,386 B2
(45) Date of Patent: May 6, 2025

(54) IMPLICITLY ASSOCIATING METADATA USING USER BEHAVIOR

(71) Applicant: Bytedance Inc., Wilmington, DE (US)

(72) Inventors: David Gourley, Chicago, IL (US); Brian Totty, Los Altos, CA (US); Ed Haslam, San Francisco, CA (US); Paul Gauthier, San Francisco, CA (US); Gary Lerhaupt, San Francisco, CA (US); Mike Y. Chen, San Francisco, CA (US); Christopher Colby, Piedmont, CA (US)

(73) Assignee: BYTEDANCE INC., Wilmington, DE (US)

( * ) Notice: Subject to any disclaimer, the term of this patent is extended or adjusted under 35 U.S.C. 154(b) by 6 days.

(21) Appl. No.: 18/178,239

(22) Filed: Mar. 3, 2023

(65) Prior Publication Data

US 2023/0325877 A1    Oct. 12, 2023

Related U.S. Application Data

(63) Continuation of application No. 17/036,933, filed on Sep. 29, 2020, now Pat. No. 11,625,753, which is a
(Continued)

(51) Int. Cl.
*G06F 16/35*        (2019.01)
*G06Q 30/0201*   (2023.01)
(Continued)

(52) U.S. Cl.
CPC ......... *G06Q 30/0255* (2013.01); *G06F 16/35* (2019.01); *G06Q 30/0201* (2013.01);
(Continued)

(58) Field of Classification Search
CPC .... G06F 16/35; G06Q 50/01; G06Q 30/0255; G06Q 30/0201; G06Q 30/0209; G06Q 30/0254
See application file for complete search history.

(56) References Cited

U.S. PATENT DOCUMENTS 6,137,498 A    10/2000  Silvers
6,801,909 B2  10/2004  Delgado et al.
(Continued)

OTHER PUBLICATIONS

U.S. Appl. No. 17/036,933, filed Sep. 29, 2020, U.S. Pat. No. 11,625,753, Issued.
(Continued)

*Primary Examiner* — Tarek Chbouki
(74) *Attorney, Agent, or Firm* — Alston & Bird LLP

(57) ABSTRACT

Social media networking applications, web sites, and services creates implicit relationships between users based on their interest or participation in real-world and optionally virtual or online activities in addition to explicitly defined peer relationships. User profiles, activity entities, and expressions may be associated with metadata to assist in searching and navigation. Metadata is implicitly associated with user profiles, activity entities, expressions, or other data entities based on user behavior using metadata collector. A metadata collector is a poll, survey, list, questionnaire, census, test, game, or other type of presentation adapted to solicit user interaction. A metadata collector is associated with metadata elements. When users interact with a metadata collector, their user profiles and the data entities included in their interactions become associated with the metadata elements of the metadata collector. These metadata element associations may then be used for any purpose.

20 Claims, 12 Drawing Sheets

Related U.S. Application Data continuation of application No. 15/904,791, filed on Feb. 26, 2018, now Pat. No. 10,839,421, which is a continuation of application No. 14/959,401, filed on Dec. 4, 2015, now Pat. No. 9,953,342, which is a continuation of application No. 12/169,599, filed on Jul. 8, 2008, now Pat. No. 9,235,848.

(60) Provisional application No. 60/948,588, filed on Jul. 9, 2007.

(51) Int. Cl.
    *G06Q 30/0207*      (2023.01)
    *G06Q 30/0251*      (2023.01)
    *G06Q 50/00*      (2012.01)

(52) U.S. Cl.
    CPC ..... *G06Q 30/0209* (2013.01); *G06Q 30/0254* (2013.01); *G06Q 50/01* (2013.01)

(56) References Cited

U.S. PATENT DOCUMENTS

| | | | |
|---|---|---|---|
| 7,031,961 B2 | 4/2006 | Pitkow et al. | |
| 7,243,105 B2 | 7/2007 | Thint et al. | |
| 7,603,350 B1 | 10/2009 | Guha | |
| 7,630,986 B1 | 12/2009 | Herz et al. | |
| 7,693,817 B2 | 4/2010 | Dumais et al. | |
| 7,844,589 B2 | 11/2010 | Wang et al. | |
| 8,230,461 B1 | 7/2012 | Ledermann et al. | |
| 9,305,119 B1 | 4/2016 | Partovi et al. | |
| 2001/0047290 A1 | 11/2001 | Petras et al. | |
| 2003/0158855 A1 | 8/2003 | Farnham et al. | |
| 2003/0227479 A1 | 12/2003 | Mizrahi et al. | |
| 2004/0128301 A1 | 7/2004 | Thint et al. | |
| 2005/0080771 A1 | 4/2005 | Fish | |
| 2005/0131721 A1 | 6/2005 | Doctorow et al. | |
| 2005/0166065 A1* | 7/2005 | Eytchison | H04L 63/102 713/189 |
| 2006/0003694 A1 | 1/2006 | Quelle | |
| 2006/0026193 A1 | 2/2006 | Hood | |
| 2006/0122876 A1 | 6/2006 | Von et al. | |
| 2006/0123010 A1 | 6/2006 | Landry et al. | |
| 2006/0143066 A1 | 6/2006 | Calabria | |
| 2006/0161599 A1 | 7/2006 | Rosen | |
| 2006/0190475 A1 | 8/2006 | Shi | |
| 2006/0195438 A1 | 8/2006 | Galuten | |
| 2006/0282835 A1 | 12/2006 | Bascom | |
| 2006/0287919 A1 | 12/2006 | Rubens et al. | |
| 2006/0291017 A1 | 12/2006 | Moran et al. | |
| 2007/0100829 A1 | 5/2007 | Allen et al. | |
| 2007/0100834 A1 | 5/2007 | Landry et al. | |
| 2007/0112761 A1 | 5/2007 | Xu et al. | |
| 2007/0116373 A1 | 5/2007 | Hwang et al. | |
| 2007/0162907 A1 | 7/2007 | Herlocker et al. | |
| 2007/0185391 A1* | 8/2007 | Morgan | A61B 5/0002 128/920 |
| 2007/0185768 A1 | 8/2007 | Vengroff et al. | |
| 2007/0226374 A1 | 9/2007 | Quarterman et al. | |
| 2007/0250863 A1 | 10/2007 | Ferguson | |
| 2007/0258656 A1 | 11/2007 | Aarabi | |
| 2007/0300174 A1 | 12/2007 | MacBeth et al. | |
| 2008/0016071 A1 | 1/2008 | Frieden | |
| 2008/0071647 A1 | 3/2008 | McQueen et al. | |
| 2008/0086318 A1* | 4/2008 | Gilley | G16H 10/20 705/319 |
| 2008/0097985 A1 | 4/2008 | Olstad et al. | |
| 2008/0098313 A1 | 4/2008 | Pollack | |
| 2008/0109491 A1 | 5/2008 | Gupta | |
| 2008/0120375 A1* | 5/2008 | Levy | H04W 4/02 709/204 |
| 2008/0120396 A1 | 5/2008 | Jayaram et al. | |
| 2008/0140679 A1 | 6/2008 | Deyo et al. | |
| 2008/0144943 A1 | 6/2008 | Gokturk et al. | |
| 2008/0163284 A1 | 7/2008 | Martinez et al. | |
| 2008/0183750 A1 | 7/2008 | Lee et al. | |
| 2008/0201388 A1 | 8/2008 | Wood et al. | |
| 2008/0320282 A1 | 12/2008 | Morris | |
| 2009/0021349 A1 | 1/2009 | Errico et al. | |
| 2009/0234784 A1 | 9/2009 | Buriano et al. | |
| 2009/0319363 A1 | 12/2009 | Callaghan et al. | |
| 2010/0153862 A1 | 6/2010 | Schreiber | |

OTHER PUBLICATIONS

U.S. Appl. No. 15/904,791, filed Feb. 26, 2018, U.S. Pat. No. 10,839,431, Issued.
U.S. Appl. No. 14/959,401, filed Dec. 4, 2015, U.S. Pat. No. 9,953,342, Issued.
U.S. Appl. No. 12/169,599, filed Jul. 8, 2008, U.S. Pat. No. 9,235,848, Issued.

* cited by examiner

IMPLICITLY ASSOCIATING METADATA USING USER BEHAVIOR

CROSS-REFERENCE TO RELATED APPLICATIONS

This application is a continuation of U.S. Patent Application No. 17/036,933, filed Sep. 29, 2020, which is a continuation of U.S. patent application Ser. No. 15/904,791, filed Feb. 26, 2018, now U.S. Pat. No. 10,839,421, which is a continuation of U.S. patent application Ser. No. 14/959,401, filed Dec. 4, 2015, now U.S. Pat. No. 9,953,342, which is a continuation of U.S. patent application Ser. No. 12/169,599, filed Jul. 8, 2008, now U.S. Pat. No. 9,235,848, which claims the benefit of U.S. Provisional Patent Application No. 60/948,588, filed Jul. 9, 2007. The entire contents of each of these applications are incorporated by reference herein for all purposes.

BACKGROUND

This invention relates to the field of social media networking services and online communities. Social media networking web sites have become very popular in recent years, especially with the youth and college-age demographics. Social media networking web sites allow users to create profiles describing themselves. Users can then create relationships between their profiles and those of their friends, classmates, and colleagues. Typical social media networking web sites allow users to utilize these relationship-based connections to keep in touch with friends, find new friends, network for career opportunities, share media, carry on discussions around topics and shared media, and to show social capital by accumulating appreciation from, or relationships with, other users.

Although social media networking web sites are useful for communicating and sharing resources with peers, typical social media networking web sites have limited facilities for user engagement. Typically, social media networking web site content is limited to viewing other users' profiles, text comments, and contributed audio-visual media. User engagement is limited to acquiring relationships with users, browsing user-contributed media, and conversing with peers via these relationships about shared media. There have been few applications of social media networking web sites other than as a communications and simple self-expression system. As a result of their limited uses, many potential users, especially adult users, find reduced value in social media networking web sites.

Many users are attracted to social media networking web sites because online profiles give users the opportunity to create a noteworthy online identity and stand out from the crowd. User profiles on typical social media networking web sites allow users to describe their interests in general terms. Users can also create freeform journal or blog entries discussing their activities and interests. However, users' online identities are fixed to the social media networking web site and cannot be utilized on other web sites or online services.

Additionally, these types of user profiles do not provide any structure for continued engagement and interaction with the social media networking web site. Many users create an initial profile and then rarely update it. Thus, many social media networking web sites have large numbers of stagnant virtual communities filled with rarely updated user profiles and passive users. Typical social media networking websites have few incentives in place to encourage user participation and interaction.

Additionally, social media networking web sites have had difficulty demanding premium advertising rates. Despite having large numbers of users, most social media networking web sites know very little about the demographics, psychographics, personal interests, and consumption behavior of their users apart from their age, home location, gender, and simple declarations of hobbies present on their profile pages. Advertisements precisely targeted at narrowly defined groups or micro-communities (such as golfers, independent music fans, wine lovers, etc.) are generally much more effective than untargeted advertisements, and thus can command substantially higher fees from advertisers. Because of the dearth of information about user interests and intent on typical social media networking web sites, it is difficult for these social media networking web sites to offer the type of targeted advertising desired by advertisers.

Moreover, social media networking web sites often feature large amounts of user-generated (as opposed to professionally produced) content. Advertisers are reluctant to purchase advertising shown in conjunction with user-generated content, because the user-generated content may create brand conflicts. The content may be offensive to the target audience or disparaging to the product or brand. To overcome this reluctance, some social media networking web sites use humans to review and approve user-generated content as safe for advertising. Because of the large volume of user-generated content created by social media networking and social media web sites with hundreds of thousands or millions of users, using human reviewers is time consuming and expensive, making it very impractical. The delay between the time user-generated content is submitted and when it is approved for advertising often means that user-generated content is "stale" by the time it is ready to accept advertisements. Moreover, advertisers miss the opportunity to reach users attracted by new or topical user-generated content.

There is a need for a social media networking service that provides additional uses besides profile networking, user communications and simple multimedia sharing to engage a wider range of increasingly sophisticated users. There is a need for a social networking service that is useful when accessed from personal computers as well as mobile devices such as cellular phones. There is a need for a social media networking service to provide richer and more detailed user profiles and to provide incentives to users to build and maintain their online identities. There is also a need for a social media networking service to enable users to export their online identities to other web sites and services.

There is also a need for a social media networking service to collect detailed demographic, behavioral, experiential, and interest information from its users to enhance their experience and to provide opportunities for targeted advertisements. There is a need to accurately classify and integrate user-generated content into the social media networking web site. There is also a need for social media networking sites to automatically recognize communities users of common interests, both for enhancing user interactions and for advertising purposes. There is a need for a social media networking service to enable advertisers to interact with users and large amounts of user-generated content while reducing the cost and delays normally associated with the review and approval of user-generated content and alleviating the concerns about brand conflicts.

SUMMARY

An embodiment of the invention includes social media networking applications, web sites, and services that creates implicit relationships between users based on their interest or participation in real-world and optionally virtual or online activities in addition to explicitly defined peer relationships. These interest-based and activity-based relationships can be used to determine detailed demographic information about users and to predict and/or recommend other activities of interest to users. Users can generate and upload content pertaining to activities, referred to as expressions, to the social media networking service provide additional demographic information and enrich the content of the social media networking service.

User profiles, activity entities, and expressions may be associated with metadata to assist in searching and navigation. An embodiment of the invention collects and implicitly associates metadata with user profiles, activity entities, expressions, or other data entities based on user behavior. Metadata collector and associated metadata elements are defined. A metadata collector is a poll, survey, list, questionnaire, census, test, game, or other type of presentation adapted to solicit user interaction. In an embodiment, a metadata collector is associated with one or more metadata elements. When users interact with a metadata collector, their user profiles and the data entities included in their interactions become associated with the metadata elements of the metadata collector. These metadata element associations may then be used for any purpose.

BRIEF DESCRIPTION OF THE DRAWINGS

The invention will be described with reference to the drawings, in which.

DETAILED DESCRIPTION

An embodiment of the invention includes social media networking applications, web sites, and services that creates implicit relationships between users based on their interest or participation in real-world and optionally virtual or online activities in addition to explicitly defined peer relationships. These interest-based and activity-based relationships can be used to determine detailed demographic information about users and to predict and/or recommend other activities of interest to users. Users can generate and upload content pertaining to activities, referred to as expressions, to the social media networking service provide additional demographic information and enrich the content of the social media networking service. Users receive recognition for the activities completed and for creating expressions by both the system and other users of the application. This recognition increases user engagement with the social media networking service by encouraging participation in further activities and creating additional expressions. Advertisers can analyze the detailed demographic data generated from the record of user activities to precisely target advertising to narrow interest groups. Advertisers can also sponsor activities, users, and expressions that meet their criteria.

Figure 1:
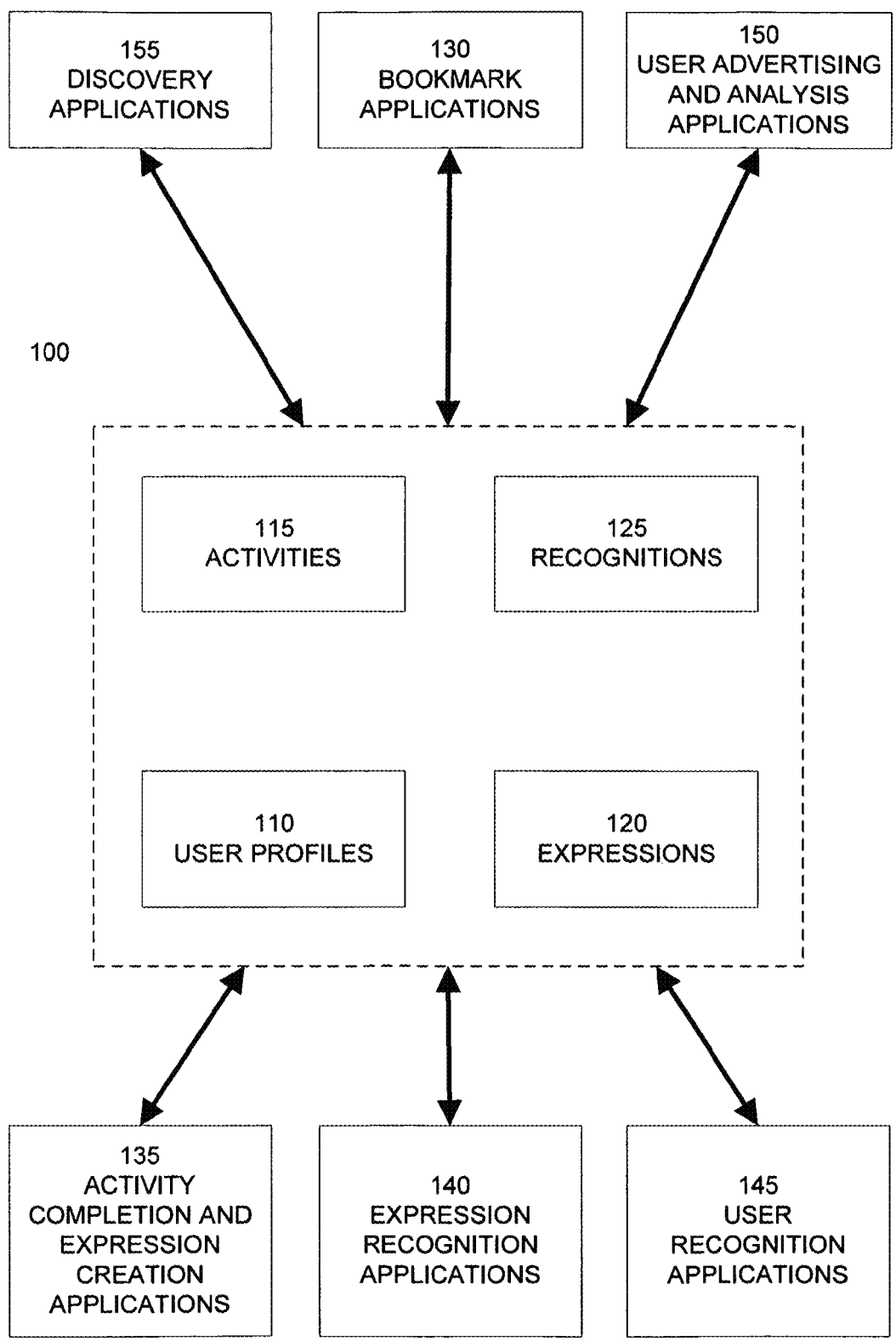
FIG. 1 illustrates functions of a social media networking application and service according to an embodiment of the invention.

FIG. 1 illustrates a social media networking application and service 100 according to an embodiment of the invention. In an embodiment, the social media networking service 100 is based around at least four different entities 105: users profiles 110, activity entities 115, expressions 120, and expression recognitions 125. User profiles 110 are created by users to describe themselves to other users of the social media networking service 100. User profiles 110 can include user provided or selected content such as biographical information, personal interests, photos, video, music, multimedia content, themes, articles, journal entries, web logs or blogs, hyperlinks or hypertext, or any other type information capable of being represented in an electronic form. User profiles 110 can also include relationships with other user profiles 110, representing peer relationships such as friends, classmates, or colleagues.

Embodiments of the invention may allow user profiles 110 to be strongly associated with users' actual identities. In these embodiments, a user establishes his or her identity via an association with a mobile device account, such as a mobile phone or wireless internet access account, via an e-mail account with strong association with user identity, such as a university or corporate e-mail account, or any other type of authentication service.

Activity entities 115 are a second type of entity in this embodiment of the social media networking service 100. Activity entities 115 are data entities that represent virtual or real-world activities. Examples of activity entities 115 include real-world locations, experiences, events, and accomplishments. Some activity entities 115 may be tied to a specific time, place, and/or event or may be independent of one or more of these criteria. Specific examples of activity entities 115 include but are not limited to books to be read; food or drinks to be tried; bands to see in concert; movies to see; places to visit; trails to hike; people to meet; sports activities to participate in or watch; restaurants, bars, museums, or stores to visit; and personal goals to accomplish. Activity entities 115 can also include interesting or whimsical experiences, such as sky-diving, eating toro sushi in 10 different restaurants, or wearing a clown suit to work. Activity entities 115 may or may not be associated with a specific real-world location and/or time.

Activity entities 115 can be generated by the social media networking service 100, by users of the social media networking service 100, and by sponsors or advertisers. Activity entities 115 can also include multiple parts or objectives, each of which may be considered as a separate activity entity. For example, a basic skateboarding skills activity could include a set of basic skateboarding tricks as objectives, each of which is itself a separate activity entity. Completion of all of these skateboarding tricks leads to completion of the aggregate basic skateboarding skills activity entity. Activity entities 115 can be nested into any arbitrary number of levels of sub-activity entities 115. Moreover, the parts or sub-activity entities 115 in an activity entity need not be exclusive. For example, a first activity to hike the ten best hikes in the San Francisco Bay Area might contain sub-activity entities 115 for each hike, while a second activity to hike the ten best hikes in California may include some or all of the sub-activity entities 115 of the first activity. Additionally, an activity may require that sub-activity entities 115 be completed in a specific order to complete the main activity, or may allow users to complete its sub-activity entities 115 in any order.

As discussed in detail below, users can select activity entities 115 that interest them (or create and select their own activity entities 115) and add them to one or more personal activity lists associated with their profile. Users can also publish their activity lists. Activity lists can be published or distributed to groups of interested users, for example using a social networking service website or a social networking application on users' mobile devices, or to other web sites or online or offline media, for example using content syndication protocols or other forms of communication. Users can later indicate to the social media networking service 100 that they have completed their selected activity entities 115.

Expressions 120 are a third type of entity in this embodiment of the social media networking service 100. Expressions 120 include user-generated content associated with one or more activity entities 115. User-generated content can include text, reviews, photos, video, audio or music, multimedia content, themes, articles, journal entries, web logs or blogs, hyperlinks or hypertext, or any other type information capable of being represented in an electronic form. Expressions 120 may be elicited from users using review or survey questions associated with an activity or may be focused on any arbitrary subject selected by users.

Expressions 120 can serve a variety of purposes in embodiments of the social media networking service 100. A user can provide expressions 120 to rate or review a particular activity. These expressions 120 can then be used to recommend additional activity entities 115 to this user as well as refine activity recommendations to similar users. A user can provide an expression to assist other users in completing or enjoying an activity. For example, an expression for a hiking trail could include a photo of a trail junction and text indicating the correct direction to follow. In another example, an expression for a restaurant activity could include a recommendation for a particular menu item. A user can provide an expression to share their experiences in completing the activity with other users. For example, an expression for a hiking activity could include a user's photograph of a scenic vista, a video of native animals, or an interesting or amusing anecdote about their experience during the hike.

Expression recognitions 125 are a fourth type of entity in this embodiment of the invention. Expression recognitions 125 allow one user to call attention to or to reward other users or their expressions 120 for their contributions to the social media networking service 100. Users may give expression recognition because they enjoyed viewing a user's expression, they found the user's expression useful, or for any other reason. User's can view their expression recognitions 125, which includes expression recognitions 125 directed at their expressions 120 as well as to themselves.

User profiles 110, activity entities 115, expressions 120, and expression recognitions 125 can be used in a number of different applications of the social media networking service 100. Discovery applications 155 enable users to identify activity entities 115 and expressions 120 of interest as well as users sharing similar interests.

One type of discovery application 155 enables users to search by keywords, parameters, or criteria for activity entities 115, expressions 120, users, recognitions, and other information. In a further embodiment, user profiles 110, activity entities 115, and expressions 120 can be associated with metadata elements to assist in searching and navigation. Metadata elements may be any type of structured data used to describe an activity entity, expression, user profile, recognition, or other type of data in the social media networking service. Metadata elements may also be used to describe the relationships between two or more activity entities, expressions, user profiles, recognitions, and/or other types of data. Metadata elements can be added by users, administrators of the social media networking service 100, or advertisers, who may be charged for the ability to add metadata elements. Some or all of the metadata elements can be organized into a hierarchical schema, such as monolithic ontologies or faceted hierarchies, or have a flat or free-form structure. The social networking service, advertisers, and/or users can each contribute and/or organize metadata for navigation and classification of user profiles 110, activity entities 115, and expressions 120.

Structured metadata can be filtered by constraints, parametrically-navigated, and/or faceted-navigated to precisely refine search results. Structured metadata can also be used to identify, evaluate, and generate ratings for places and activity entities 115 using complex multidimensional criteria. In an embodiment, canonical rules and metadata analysis techniques can be used to ensure metadata elements are consistent and to identify equivalent metadata elements, such as those resulting from misspellings and word variations (e.g. a "hiking" metadata element and a "hike" metadata element may be considered to be equivalent).

Another type of discovery application 155 recommends activity entities 115 to users based on their previously completed activity entities 115, their ratings of activity entities 115, their similarities with other users, and expressions 120 associated with activity entities 115, and users' preferences. For example, a discovery application 155 can recommend activity entities 115 with similar metadata elements as the activity entities 115 previously completed by a user. In another example, a discovery application 155 can identify other users having completed some of the same activity entities 115 as a given user, and then recommend further activity entities 115 to the given user based on the activity entities 115 of the other identified users. In a further example, statistical correlations, clustering, and other statistical analysis and data mining techniques can be used to identify common traits or interests of users to provide recommendations.

As discussed in detail below, users can indicate their interest or approval in the expressions 120 created by other users, referred to as expression recognitions 125. Yet another example of a discovery application 155 uses the expression recognitions 125 given by a user to determine additional activity entities 115 of potential interest to that user. For example, if a first user gives an expression recognition to a second user's expression including a restaurant review, then the discovery application 155 can recommend other restaurants positively reviewed by the second user to the first user as additional activity entities 115. As discussed in detail below, users or discovery applications can analyze a dynamically selected subset of users, or scope, to identify additional activity entities 115 of interest.

Bookmarking applications 130 enable users to select and remember activity entities 115 of interest to be completed, to collect activity entities 115 of interest, or to identify favorite activity entities 115 completed or to be completed. One example bookmarking application 130 allows users to select one or more activity entities 115 from a discovery application 155 and add the selected activity entities 115 to one or more lists. In one implementation, users can create one or more lists to categorize or organize the activity entities 115 they wish to complete. One implementation of this example bookmarking application 130 can be accessed using a web browser or a dedicated application on a personal computer. Another implementation of this bookmarking application 130 can be executed on a mobile phone, smart phone, personal digital assistant, or other portable or handheld electronic device. In a further implementation, the bookmarking application 130 is adapted to the features and limitations of the mobile device and may include a simplified interface designed for ease of use with the small screen and limited input controls of portable electronic devices.

In still a further implementation, discovery 125 and bookmarking 130 applications can utilize location determination services and sensors, such as global positioning system (GPS) services, radio location services, inertial navigation systems, or mesh networks, to determine the location of the user. In another implementation, users can manually provide their location, for example by entering an address or a map location or by selecting a location from a list of previously saved locations, The user's location can be used to filter or narrow the list of activity entities 115 presented to the user. For example, a discovery application 155 on a portable device can present a user with a list of activity entities 115 near the user's current location. This feature can encourage users to try new activity entities 115. In another example, a bookmarking application 130 can present a user with a list of previously bookmarked activity entities 115 that are also near the user's current location. By allowing users to limit the scope of their activity entities 115 to the current location, the social networking service makes searching and navigation more feasible on the limited user interfaces of mobile devices.

In yet a further implementation, a bookmarking application 130 enables users to indicate that they are currently participating in an activity. For example, a user can select one of their bookmarked activity entities 115 using a bookmarking application 130 on their portable electronic device. This selection will be provided to the social media networking service 100, which will later ask users if they completed the selected activity and solicit expressions 120 pertaining to the activity. In yet another implementation, the bookmarking application 130 may automatically infer that the user is undertaking an activity based on the user's current location. In a further embodiment, the user's location is used to filter the user's bookmarked activity entities 115 so as to present bookmarked activity entities 115 to the user that are near the user's current location.

Users inform the social media networking service 100 that an application is complete using activity completion applications. One example activity completion application 135 allows users to check off or otherwise mark activity entities 115 as complete on their lists of bookmarked activity entities 115. Another example activity completion activity 135 asks the user if an activity is complete via the user's portable electronic device, such as by sending a message or presenting a dialog box to the user. The user may initiate the application completion communication or alternatively, the social media networking service 100 may query the user to determine if the activity is complete. In the latter case, a query can be initiated in response to a determination that the user is undertaking an activity via a bookmarking application 130, as discussed above.

Activity completion applications 135 can optionally include validation systems to ensure that users actually complete activity entities 115. In one implementation, different types of validation are employed for different types of activity entities 115. For some activity entities 115, validation may be omitted if the activity does not have any financial, scorekeeping, or other implications, because user fraud is of little consequence on the social media networking service 100. For more important activity entities 115, such as activity entities 115 that determine a user's rank relative to other users, activity entities 115 created by sponsors, and activity entities 115 involving prizes or rewards, one or more validation systems may be used.

Peer review is one validation system. Other users can review a given user's expression for an activity and flag or mark the expression as fraudulent. Reputation and trustworthiness scores and voting schemes can be used to prevent abuse of the peer review validation.

For activity entities 115 involving a specific location, providing user location information from a portable electronic device can serve as validation for completing an activity. For example, if an activity is climbing a mountain, then the user's location data at the top of the mountain serves as validation for this activity.

A challenge-response validation scheme can be used for some activity entities 115. A challenge-response validation asks the user a question that would be relatively easy to answer if the activity was completed. For example, if an activity is to visit a museum, then the challenge question may be to identify a word on a sign at a specific location in the museum.

Photographs can also be used to manually or automatically validate a user's completion of an activity. For example, a photograph of a user at a restaurant would validate that the user has eaten at that restaurant. Peer review can be used to flag photographs that are inaccurate, such as the user at a different restaurant. Additionally, machine or camera-readable bar codes or other types of data encoding schemes can be placed at the location of an activity or on products associated with an activity. Users completing the activity scan or photograph the bar code, which is then forwarded to a validation application for evaluation. Advertisers or event sponsors can place these bar codes at the location of the activity or on the product associated with the activity as a way of engaging users of the social media networking service 100. The use of these bar codes may be linked to loyalty, rewards, or prize programs run by the advertiser.

Once a user indicates that an activity is complete, the social media networking service 100 will provide the user with an opportunity to create an expression associated with the activity. In one example, an expression creation application 135 will provide a survey or questionnaire to the user about the activity. The data provided by the user is used to create the user's expression for this activity. In another example, an expression creation application 135 on a portable electronic device will ask for a simplified expression about an activity, such as whether the activity was enjoyable or not. The social media networking service 100 may then ask for more detailed expressions 120 from the user for the activity at a later time when the user is accessing the social media networking service 100 via a personal computer.

In an embodiment, an activity completion application 135 can be implemented as an application or a web page adapted to be operated via a mobile device, such as a mobile phone. In this embodiment, the activity completion application 135 may be configured to collect feedback from users about an activity and associated locations and attributes at or near the time of completion. By providing facilities for collecting "in-the-moment" feedback and ratings, a larger proportion of users will provide feedback as compared with applications that collect feedback at a later time.

For example, an activity completion application 135 may ask a user to give a "thumbs up" or "thumbs down", a numeric ranking, or any other quantitative or qualitative ranking to an activity or to a particular attribute thereof. The activity completion application 135 can utilize the activity database and optional location determination services and sensors to determine context to guide the requested feedback. For example, if an activity is done in a restaurant, the activity completion application 135 may request the user to provide feedback about food quality, atmosphere, noise level, price, or other factors relevant to a restaurant. If the activity was done at a golf course, the application can enquire about course difficulty, greens fees or aesthetics. If the activity involved physical activity, the activity completion application 135 can enquire about athletic difficulty or duration.

Another example expression creation application 135 enables users to upload text, photos, video, audio or music, multimedia content, themes, articles, journal entries, web logs or blogs, hyperlinks or hypertext, or any other type information capable of being represented in an electronic form as an expression for an activity. This example expression creation application 135 can include templates and other formatting tools to allow users to control the presentation of data in their expression.

Expression recognition applications 140 enable users to give accolades or recognition to other users' expressions 120. Users may give expression recognition because they enjoyed viewing the expression, they found the expression useful, or for any other reason. Expression recognition applications 140 may enable users to mark or associate expressions 120 with expression recognitions 125 and metadata elements. Expression recognition applications 140 may also allow users to submit negative feedback about other user's expressions 120. Expression creators can later view their recognitions, either individually or in aggregate. In some implementations, users can select between two or more different types of expression recognitions 125, such as marking expressions 120 as funny, useful, or beautiful. In a further implementation, sponsors or advertisers can give out their own customized expression recognitions 125. In a further implementation, users, sponsors, advertisers, or activity creators may define their own types of expression recognitions 125. For example, a sponsor may create a custom expression recognition to acknowledge users that have used their product in a unique or interesting way.

Expression recognitions 125 can be used to determine qualitative attributes of expressions 120. For example, if a photograph expression is marked as "beautiful" by many users, then it can be inferred that the photograph expression includes a beautiful photograph. Expression recognitions 125 can also be used to rank expressions 120 associated with activity entities 115. In some implementations, higher ranked expressions 120 are given more prominent placement on web pages associated with their activity entities 115. Users with many expression recognitions 125 may be considered to be "experts" or "tastemakers" in particular areas, and thus featured more prominently on the social media networking service 100. Newly created expressions 120 from these expert users may be assigned higher initial ranks as a result of the popularity of their previous expressions 120.

Furthermore, expression recognitions 125 can be used to determine the preferences and interests of the user giving the expression recognition. When a user gives an expression recognition to an expression, it creates an implicit relationship between that user and the expression creator, the expression, and the activity. The expression recognition indicates that the user likes the activity (or in the case of a negative recognition, dislikes the activity), the user creating the activity, and/or some aspect of the expression. This information can be used to provide recommendations for additional activity entities 115 and for targeting advertising at narrowly defined communities of interest. For example, if a user gives expression recognitions 125 to expressions 120 related to mountain climbing, then the user is obviously interested in mountain climbing. Advertisers can then tailor their advertisements to this user's interests.

In addition to giving expression recognitions 125, user recognition applications 145 give users accolades or praise for their interests, completed activity entities 115, expressions 120, or recognitions. One user recognition application 145 generates and presents a badge to a user based on the user's accomplishments. A badge is a system-generated visual representation of the user's real-world or virtual accomplishments, such as his or her completed activity entities 115. In a further embodiment, a badge can include activity entities 115 that a user has bookmarked but not completed. An example of a badge is discussed in detail in FIG. 3 and can include one or more scores or summaries of the user's completed activity entities 115. A user's score or scores can be based on the number of activity entities 115 completed, the types of activity entities 115 completed, the number and type of expressions 120 created, and the number and type of expression recognitions 125 received. The user's score can be an aggregate measurement of a user's achievements in one or more types of activity entities 115, expressions 120, and expression recognitions 125.

In one implementation, a user's badge is automatically generated and displayed in the user's profile. The badge may be visible to both the user and other users viewing that user profile. In a further implementation, the badge (either in full or in an abbreviated form) may be displayed in association with users names and photos as part of a discovery application. For example, if a user creates an activity, the web page describing the activity may include the user's name and an abbreviated version of their badge summarizing that user's accomplishments, such as the total number of activity entities 115 completed or their total activity score.

In an embodiment, user badges can be exported to other web sites or services. For example, a user can embed their badge in a different web page or display it on their mobile device. An implementation of badges can use HTML, CSS, XML, Flash, web scripting languages, or any other technology for transferring information data and presentation markup metadata. In further implementations, widgets, which are self-contained web page or desktop applications, can be used to present badges to users outside of the social networking service.

Another user recognition application 145 uses game play incentives to encourage users to complete activity entities 115 and create expressions 120. One example of a game play incentive ranks players according to their accomplishments and displays leaderboards with the top-ranked players. Leaderboards may be scoped by interest or activity type, location, user characteristics, and/or user location. One implementation of this user recognition application 145 dynamically selects the scope of the leaderboards presented to a user to make that user feel accomplished. An example of a dynamically-scoped leaderboard might list the top female golfers in San Francisco's Mission neighborhood between the age of 35 and 40 that have also played at the Pebble Beach golf course. By narrowing the criteria associated with a leaderboard, a user's ranking on that leaderboard is likely to improve.

Leaderboards can be presented in conjunction with activity entities 115 in discovery applications. For example, a list of skateboarding activity entities 115 in a discovery application 155 can include a leaderboard for the top-ranked users that have completed some or all of these activity entities 115. Users can also define their own leaderboard criteria and view the top-ranked users as well as their own ranking. Criteria can be based on attributes of user profiles 110 as well as data or metadata elements associated with activity entities 115.

A further implementation of a user recognition application 145 allows users, social media networking service 100 administrators, and advertisers to create their own leaderboards. For example, a user can create a top hiker in San Francisco leaderboard that ranks users from San Francisco according to the number of hiking activity entities 115 that have been completed. Users in San Francisco that are interested in hiking will see their own rank on this leaderboard and may be encouraged to undertake additional hiking activity entities 115 to improve their ranking. In this way, leaderboards encourage activity completion among users in interest groups and thus user engagement with the social media networking service 100. Leaderboards can be open to all users of the social networking service, open only to users satisfying specific criteria, open by invitation only, or restricted to a specific set of users, such as friends or colleagues of the activity creator.

Sponsored leaderboards can encourage product use and brand awareness as well as collect demographic information about current and potential customers. For example, a beverage company could have a leaderboard ranking the users who have ordered their beverage in the most bars. In this example, ordering this beverage in a given bar is considered to be completing an activity. As users complete activity entities 115 on this example leaderboard by ordering this beverage in multiple bars (and optionally validating their purchases), the advertiser learns which users prefer their beverage; the other interests of these users, which can be used to identify other potential customers; and the locations, such as the cities, neighborhoods, or types of bars where their beverage is most popular.

User advertising and analysis applications 150 enable advertisers to analyze the demographic data collected about users of the social media networking service 100 and to purchase various types of advertisements. Advertisers can use the social networking service to build their brand and/or to generate user impressions. One user advertising and analysis application 150 enables advertisers to search for users based on information in user profiles 110 as well as data and metadata associated with activity entities 115 or expressions 120 of users. For example, an advertiser can search for users located in California that have completed a water-skiing activity. The user advertising and analysis application 150 can provide additional information about the users that match this criteria, such as other activity entities 115 popular with this group, the specific locations where these users participate in water-skiing, or any other type of individual or aggregate attributes of this subset of users. This information can be used by advertisers to recognize new business opportunities or to more precisely target their advertising.

Additionally, advertisers can purchase various types of advertisements targeted to users meeting any criteria. For example, an advertiser can purchase advertising on the social media networking service 100 to all users in Los Angeles that have completed or have bookmarked a water-skiing activity. Alternatively, an advertiser can purchase advertising to any user in Los Angeles that views a water-skiing activity using a discovery application. Advertisers can purchase exclusive advertising for a given criteria, a fixed quantity of advertisements over a given time period, or a percentage of the advertisements presented to users matching the advertiser's criteria over a given time period. One implementation of the user analysis and advertising application allows advertisers to view the price of advertisements based on the type of advertisement and the advertising criteria and complete the purchase of advertising online. This price can be determined manually or automatically by the social media networking service 100 based on the type of advertisement, the advertising criteria, the demand for advertisements within this criteria, the number of users potentially included in this criteria, and any other factor. A further implementation of the user analysis and advertising application enables advertisers to monitor the success of their advertisements, such as user traffic, user clicks, conversion ratios, and other advertising metrics.

The social media networking service 100 can provide a variety of different types of advertisements and marketing opportunities to advertisers. The social media networking service 100 can charge advertisers for each of these types of advertisements or marketing opportunities. Advertisers can purchase text or graphic banner ads displayed on web pages matching their criteria, such as activity pages or user profile pages. Advertisers can send messages, such as e-mail, MMS, video or text messages, mobile web pages using WAP or other protocols, or advertisements within a mobile application, to users matching their criteria. Advertisers can also select activity entities 115 of interest to their potential customers, associate these selected activity entities with metadata elements indicating their association with advertisers, and create sponsored or branded leaderboards. Advertisers can sponsor special badging for loyal or enthusiastic customers, which may then appear on the user's badge. Advertisements may be priced at a fixed rate or adjusted in price dynamically based on the types and numbers of users targeted, the type and duration of advertisement, and the demand by advertisers for a particular advertising target. For example, an online auction scheme may be used to determine pricing of advertisements.

Advertisers can also create their own sponsored activity entities 115. For example, a car company could create a set of scenic drive activity entities 115, such as the "Ten Best Drives for Your Brand X Car." In addition to presenting these sponsored activity entities 115 to users of the social networking service, a further embodiment of the social networking service allows unsponsored and sponsored activity entities 115 to be syndicated to other web sites or services. For example, the sponsored list of scenic drives could be syndicated to web sites about driving or travel. The social networking service can earn revenue by charging advertisers to create sponsored activity entities 115, by charging advertisers to syndicate their activity entities 115 to other web sites and services, and/or by charging other web sites and services for syndicated activity entities 115 and other content.

Advertisers can also sponsor users as brand ambassadors, similar to the sponsorship of professional athletes. In one implementation, users that satisfy an advertiser's criteria can be contacted by the advertiser and offered a sponsorship. The advertiser may provide monetary or non-monetary compensation to the user in exchange for accepting this sponsorship. The sponsored user's profile 110, bookmarked or completed activity entities 115, and expressions 120 may be branded or otherwise associated with advertiser. The sponsored user's profile 110, activity entities 115 and expressions 120 may be featured prominently on web pages selected by the advertiser. For example, a record company could identify music fanatics by searching for users that have completed large numbers of music-related activity entities 115. These users can then be offered free music or concert tickets in exchange for sponsorship. When other users search for music-related activity entities 115 or expressions 120, such as upcoming concerts, record reviews, or concert photos, the sponsored user's profile 110, activity recommendations or bookmarked activity entities 115, and/or their music-related expressions 120, along with the sponsor's advertisement or other content, will be featured prominently in the discovery application 125. In some implementations, the interaction between advertisers and sponsored users is a self-service application for the users and advertisers. Once a user has accepted sponsorship, the sponsored user and the advertiser are free to interact as often and in any way they wish.

The applications discussed above can be implemented as standalone applications using platform-specific or platform independent programming languages, as desktop widgets, or as web-based applications using hypertext markup languages, web browser plug-ins, and server-side and/or browser-side scripts and programs. Web 2.0 and mobile web technologies and architectures, such as AJAX, Comet, Flash, Java and J2ME, and WAP, can be utilized to provide a rich user interface for these applications. Web-based applications can utilize web browser or browser plug-in storage functions to maintain application functionality when no network connection is available and to later synchronize any changes with the social media networking service 100 when the network connection is restored.

Figure 2:
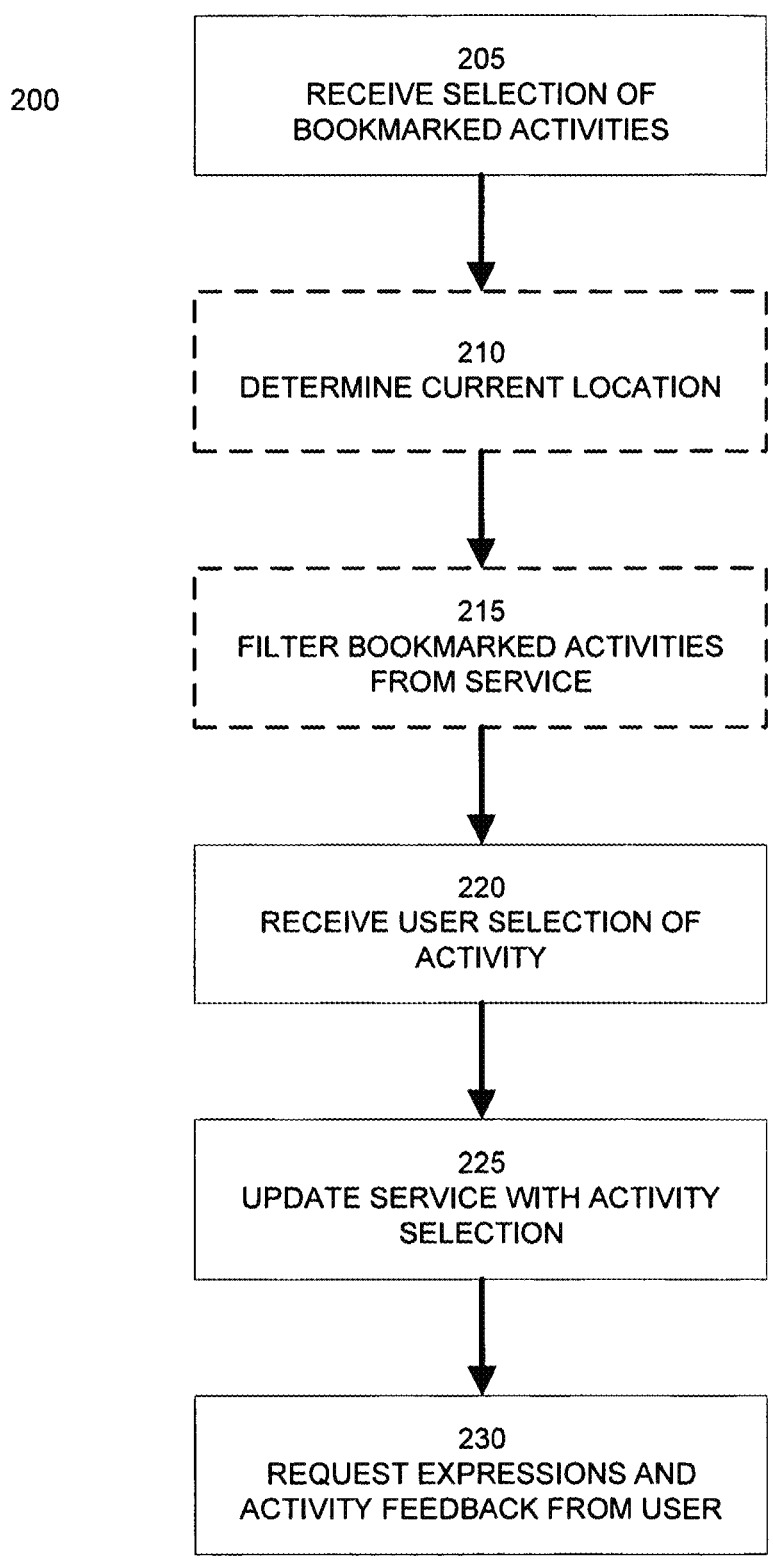
FIG. 2 illustrates a method of selecting and updating user activities according to an embodiment of the invention.

FIG. 2 illustrates a method 200 of selecting and updating user activity entities according to an embodiment of the invention. This method 200 can be implemented via an application executing on a personal computer and/or on a portable electronic device. In step 205, a user first provides a selection of the bookmarked activity entities to the social media networking service. This selection of bookmarked activity entities is made available whenever users access the social media networking service, whether via their personal computers, different computers, or their portable electronic devices such as mobile phones.

In step 210, the application may optionally determine a location of the user each time the application is accessed by the user. In step 215, this location information may optionally be used to help filter or narrow the list of bookmarked activity entities to those near the user's current location. Alternatively, in step 215, the user can optionally filter their list of bookmarked activity entities using any criteria.

In step 220, the application receives a selection of an activity. The user may manually select an activity to indicate that he or she is participating in this activity or the application may ask the user if he or she is currently performing an activity in response to the determination that the user is at the location of a bookmarked activity. The activity selected may be from the user's list of bookmarked activity entities or from any of the other activity entities listed by social media networking service. While there might be many activity entities near a user, by using the user's bookmarked activity entities, the social networking service can filter these activity entities to determine the most likely activity entities to be selected.

In step 225, after receiving a selection of an activity, the application notifies the social media networking service of this selection. This allows the social media networking service to track the activity entities completed by the user and to later, in step 230, solicit expressions and other activity feedback from users.

In a further embodiment of step 230, the solicitation of activity feedback is tailored to the context of the user and to the type of activity. For example, if the user is accessing the social networking service via a mobile device, an abbreviated solicitation of activity feedback may be used, in recognition of the limited interface of mobile devices as well as the fact that the user may be otherwise occupied. An example of this would be to ask the user simply if the activity was good or bad. A more detailed solicitation of activity feedback can then presented to the user when he or she later accesses the social networking service with a personal computer. In an additional example, if the user has completed a golf activity, the solicitation of activity feedback may ask about the quality of the groundskeeping and the availability of tee times, while the solicitation of activity feedback from a restaurant activity may ask about food quality and service.

Figure 3:
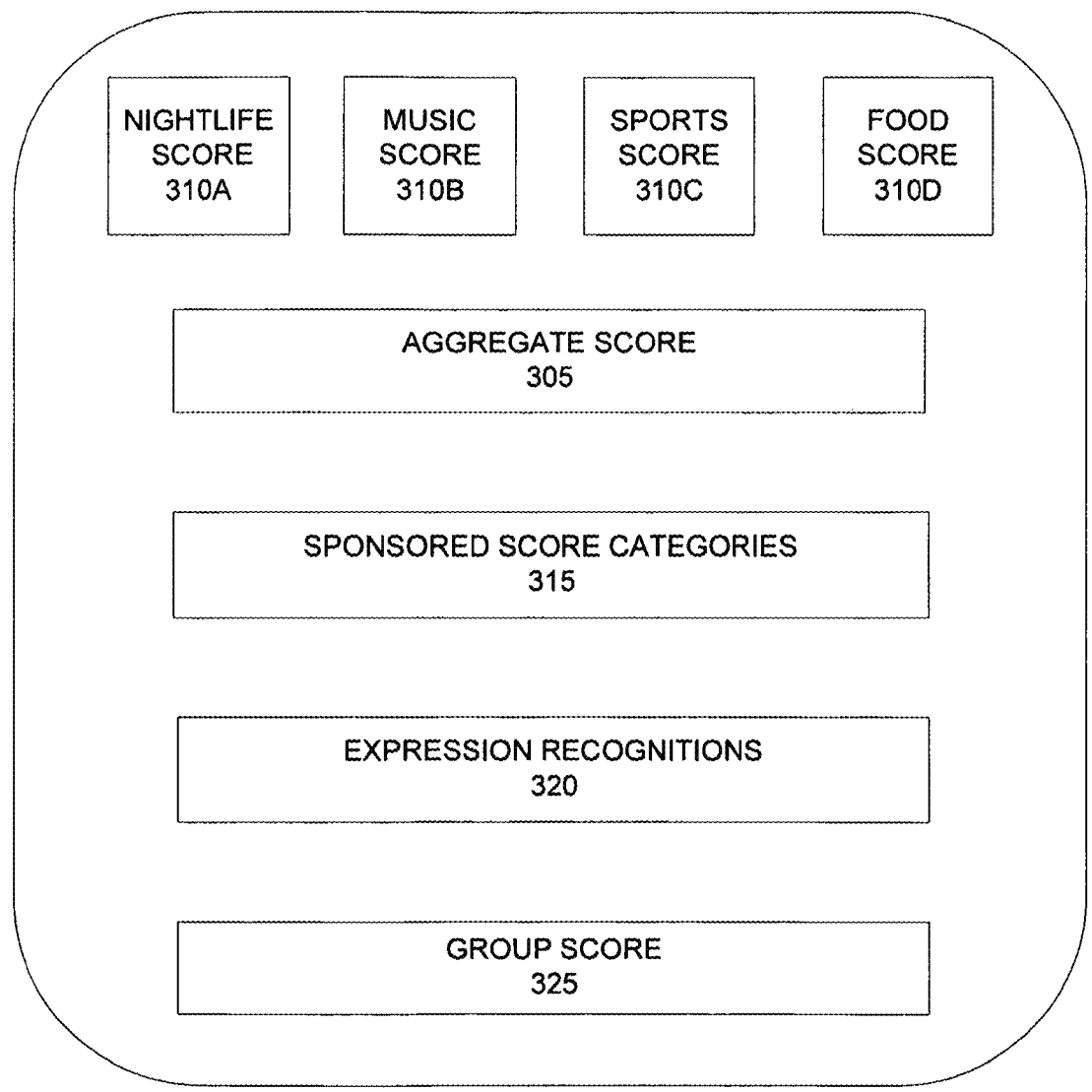
FIG. 3 illustrates an example badge adapted to encourage user engagement with the social media networking service according to an embodiment of the invention.

FIG. 3 illustrates an example badge 300 adapted to encourage user engagement with the social media networking service according to an embodiment of the invention. As discussed above, a badge 300 is a system-generated visual representation of the user's real-world accomplishments, such as his or her completed activity entities. The example badge 300 of FIG. 3 includes one or more scores or summaries of the user's completed activity entities. A user's score or scores can be based on the number of activity entities completed, the types of activity entities completed, the number and type of expressions created, and/or the number and type of expression recognitions received. Example badge 300 includes an aggregate score indicator 305 providing a summary of the total accomplishments or completed activity entities of the users.

Scores can be broken down into categories, which can be determined via the metadata elements associated with activity entities. For example, a badge 300 might list scores for a user's three or four most active activity categories. For example, if a user completes many activity entities related to bars, music, sports, and restaurants (as determined from the metadata elements associated with their completed activity entities, their badge 300 might display separate scores 310 for nightlife 310*a*, music 310*b*, sports 310*c*, and food 310*d*. These categories may vary depending on the user's interests and completed activity entities. Another user that completes many activity entities related to wine, reading, and golf will have a badge 300 that lists scores for wine, books, and golf categories. Similarly, if a user receives large amounts of expression recognition for his or her expressions, his or her badge 300 can include an expression recognition indicator 320, for example stating that the user is considered a hiking expert or popular photographer. A badge 300 may also include sponsored score categories 315, which are scores based on a user's completion of advertiser sponsored activity entities. Additionally, a badge 300 may list a score based on a user's membership in one or more groups of users. For example, if a user belongs to a "San Francisco Hikers" group, then his or her badge 300 may include a "San Francisco Hiking" score in a group score indicator 325.

The visual appearance of a badge 300 can be enhanced using images, icons, logos, animations, or other types of text or graphics. The visual appearance of the badge 300 can be influenced by the types and categories of a user's interests and completed activity entities. For example, a user that is an outdoor sports enthusiast may have a badge 300 with an outdoors visual theme, while an auto-racing fan can have a badge 300 with an auto-racing visual theme.

In a further implementation, users may be able to design their own badges or customize the badges generated by the service. For example, a graphical layout editor can be used to design the visual appearance of the badge 300 and the arrangement of icons, logos, or other indicators on the badge 300. In another example, users can select a badge 300 theme that alters the appearance and/or content of their badge 300. In still another example, users can select which activity entities to emphasize on their badge 300. For example, users may wish to emphasize their academic achievements on their badge 300 and deemphasize (or hide) their nightlife-related achievements. In a further example, users may create and customize multiple badges to emphasis different aspects of their life. Users may create an academic and sports achievement badge 300 to present on web pages available to their family and coworkers and a nightlife and music badge 300 to present on web pages available to their friends. In this example, the social networking service may includes features for managing multiple badges for each user and for enabling users to control the access and presentation of these badges to other users and web sites.

Implementations of badges can be automatically generated and displayed in the user's profile. The badge 300 may be visible to both the user and other users viewing that user profile. In a further implementation, the badge 300 (either in full or in an abbreviated form) may be displayed in association with users names and photos as part of a discovery application.

Figure 4:
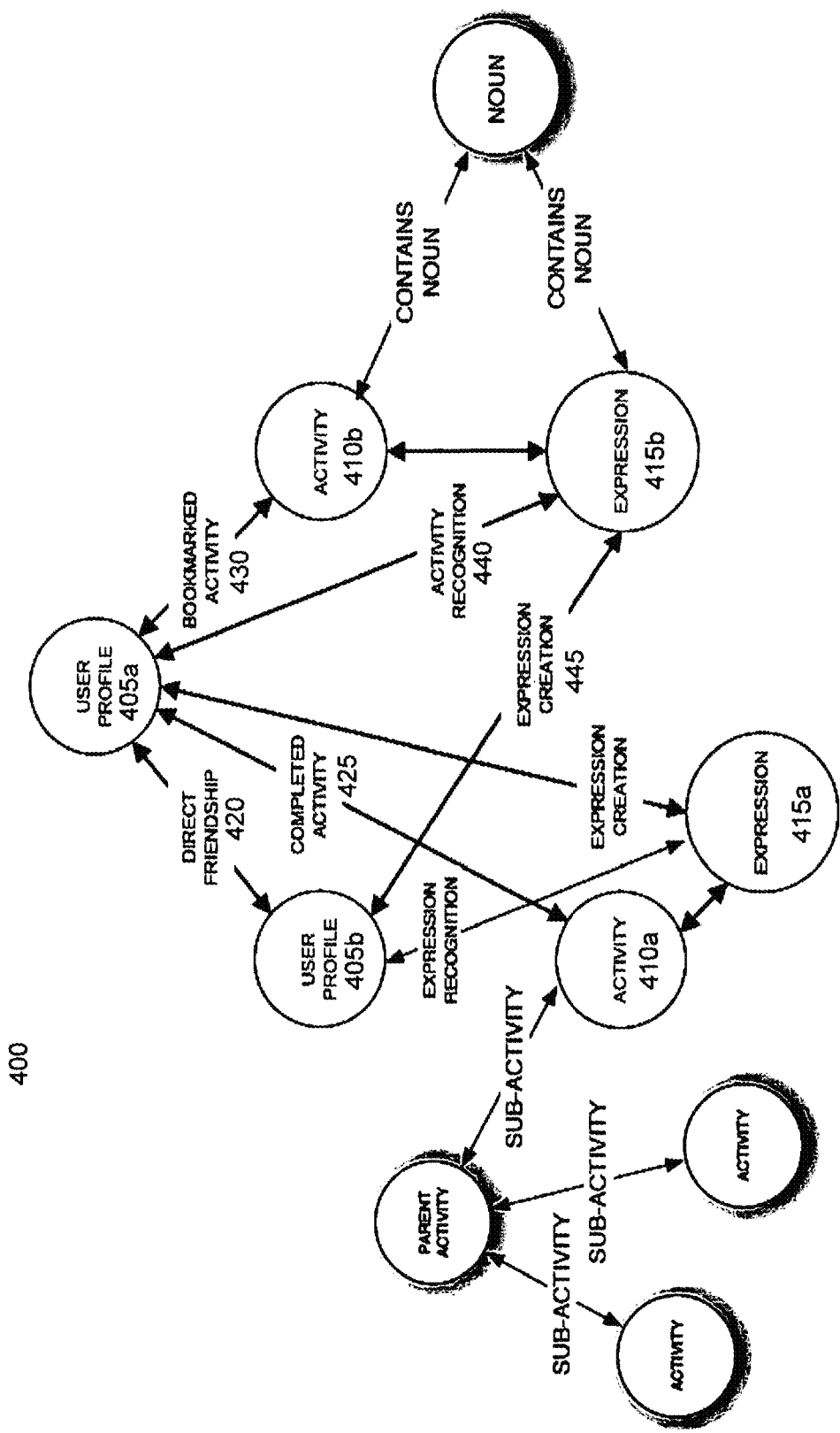
FIG. 4 illustrates a graph of data elements and associated graph relationships according to an embodiment of the invention.

FIG. 4 illustrates a graph of data elements and associated graph relationships according to an embodiment of the invention. As discussed above, data elements of the social media networking service can include user profiles 405, activity entities 410, and expressions 415. Different types of relationships can be created between these data elements. A direct friendship relationship 420 between two user profiles 405 indicates that these users are friends, classmates, colleagues, or peers. A relationship between a user profile 405*a* and an activity 410 indicates that the user has either bookmarked 430 or completed 425 that activity. A relationship 435 between one or more activity entities 410 and an expression 415 indicates that the expression 415 is related to that activity. A relationship between a user profile 405 and an expression 415 indicates that the user either created the expression 445 or has given another user's expression an expression recognition 440.

The graph 400 of data elements in FIG. 4 is intended as an example and embodiments of the invention can be implemented using arrangements of data elements. Furthermore, additional types of data elements can be included in the graph. If an embodiment of the social media networking service includes discussion groups, then data elements representing the discussion group itself and discussion within the group can be included in the graph and linked by relationships with user profiles 405, activity entities 410, and expressions 415.

Figure 5:
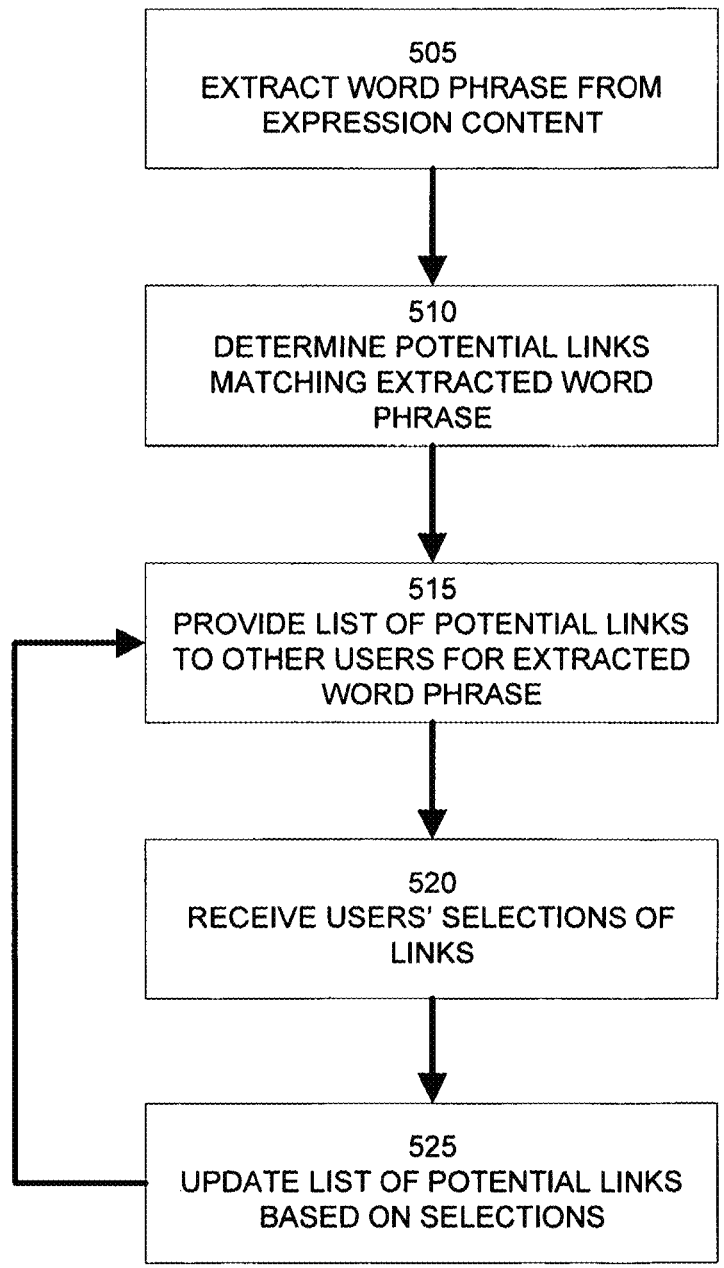
FIG. 5 illustrates a method of accurately classifying and hyperlinking user-generated content according to an embodiment of the invention.

One problem with user-generated content is that it is difficult to classify and categorize to enable user searches. FIG. 5 illustrates a method 500 of accurately classifying and hyperlinking user-generated content for search, navigation, and analysis according to an embodiment of the invention. The method 500 of FIG. 5 combines automated language analysis techniques with a peer-review mechanism to classify and hyperlink user-generated content.

Upon receiving user-generated content, such as user-created activity entities or an expression related to an activity, step 505 of the method 500 uses grammar and language analysis techniques, machine learning techniques, data mining techniques, and other language processing techniques known in the art to identify and extract statistically significant word phrases from user-generated content. These extracted word phrases will be used to categorize the user-generated content and form the basis of links between this user-generated content and other content provided by the social media networking service. For example the system might detect the word phrase "Bay Area" in the title "Top 10 Bike Rides in the Bay Area", and identify it as a canonical and semantically interactive location object.

Step 510 of the method 500 uses extracted word phrase to identify potential categories for the user-generated content. This can be done by comparing the extracted word phrase phrases with the metadata schema used to classify and organize activity entities and expressions and determining if the extracted word phrases match or are similar to specific metadata elements. Alternatively, a metadata element may be associated with one or more specific key words representing statistically significant word phrases typically found in content associated with this metadata element. By matching the extracted word phrases with key words associated with metadata elements, one or more metadata elements can be associated with the user-generated content, other content on the social networking service, and/or content outside of the social networking service.

In some cases, there may be some ambiguity associated with extracted word phrases In these cases, step 515 of method 500 provides a hyperlink associated with the extracted word phrases that includes a list of alternative links to potentially related content. Users can be expected to select the most relevant of these alternative links. Step 520 receives user's selection of one of the alternative links. By tracking which links are selected by users, step 525 of the method 500 can update its list of potentially related content. Once sufficient user responses have been collected, the ambiguity is eliminated and the extracted word phrase is linked only to the correct content. This allows users to resolve the ambiguity of a word phrase by "voting through their actions". In a further embodiment, if none of the potential links associated with an extracted word phrase is correct, then a user may supply additional information to help the system identify appropriate related content or delete the erroneous link.

For example, a user may create an expression with the word "stones." After extracting this word phrase and analyzing its index of key words and metadata, the method 500 in this example may infer that this word phrase "stones" refers either to the music group "The Rolling Stones" or to activity entities related to mountain climbing. In this example, the user-generated content is presented to other users with a hyperlink on the word "stones." When other users view this content and select the word stones, a list of hyperlinks will be presented to the user that direct the user to other content related to either the Rolling Stones or to mountain climbing. This content may be internal to the social networking service or external to the social networking service. The user can select the link he or she believes is most relevant to this context of the word "stones." This selection will then be used to update the hyperlinks associated with this word.

In an embodiment, this list is presented in an unobtrusive manner by creating a pop-up window when the user's mouse cursor hovers over the word "stones" in the content. This window disappears when the user's mouse cursor moves away from this word.

Continuing with this example, the user-generated content may not be related to the Rolling Stones or to mountain climbing, but instead to the medical condition of kidney stones. In this case, users can provide additional information to assist the system in generating appropriate hyperlinks. In an embodiment, the list of hyperlinks presented to a user includes a field for entering other key words to correctly classify the content. In this example, upon being presented with a window including hyperlinks for the Rolling Stones and for mountain climbing, the user could enter the phrase "kidney stones" to update the list of hyperlinks with different context associations. The user entered phrase may correspond with a preexisting metadata element or a key word potentially associated with a metadata element. This updated list can be later presented to other users to verify or further refine the hyperlinks associated with the user generated content.

In many online review and city information web sites, the aggregate reviews or ratings of restaurants and other businesses based on user submissions all tend to converge to an average value. Because all businesses end up with approximately the same rating, the reviews or ratings become virtually meaningless. To avoid this problem and provide meaningful and informative reviews, an embodiment of the invention includes dynamic scoping of reviews and other expressions pertaining to activity entities. Moreover, it is difficult to determine which review represents the best summary of the aggregate opinion of an activity.

Dynamic scoping allows the social media networking service or users to manually or automatically specify a subset of users to be used to determine a recommendation or rating for an activity. In one example of dynamic scoping, statistical correlations, clustering, and other statistical analysis and data mining techniques can be used to identify common traits of a given user and a subset of the other users of the social media networking service. This subset of users, rather than the entire set of users, is used to determine a rating of an activity tailored to the given user's preferences. The subset of similar users can be identified using the completed activity entities, expressions, and expression recognitions of the given user.

Figure 6:
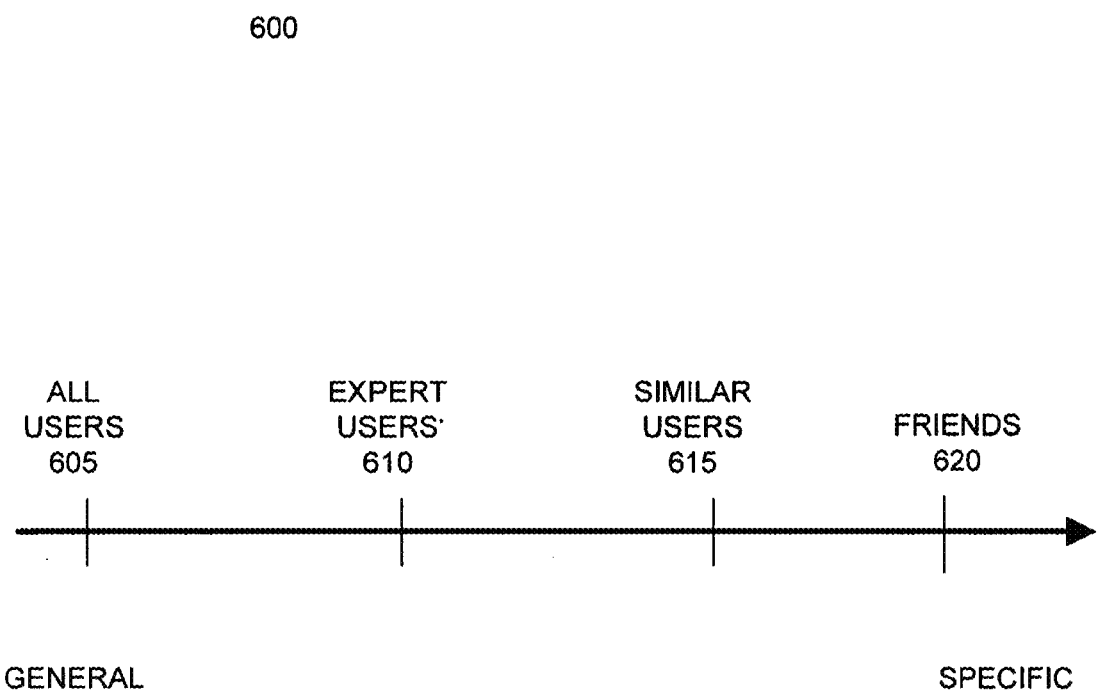
FIG. 6 illustrates example scopes for searching and navigating social media networking content according to an embodiment of the invention.

Users can manually specify the scope of users to include in searching, navigating, and evaluating activity entities and expressions. FIG. 6 illustrates example scopes 600 of social media networking content according to an embodiment of the invention. At the broadest or most general, the scope includes all users 605. Narrower scopes include expert users 610, where experts can be determined by the number of expression recognitions received in general or related to a particular type of activity; similar users 615, which are users that share one or more traits, and at the most specific, the friends, classmates, colleagues, or other peers 620 of the user. In further embodiments, users can manually specify complex scopes of users and activity entities. For example, a user can ask for the best seafood restaurants in Seattle as determined by food experts under the age of 40.

In a further embodiment, users can save or bookmark different scopes to assist in future searches. For example, a user might bookmark a scope of users including expert hikers in California to assist in future searches for hiking trails, a scope including food and wine experts to assist in future searches for fine dining experiences, and a scope including their friends to assist in planning dinners at restaurants that are enjoyable to the majority of one's friends. In another example, users can use a discovery application to view reviews or expressions. A first user can select or mark expressions that they agree with. The other users that created these expression can be added to a specific scope of experts for the first user. The first user can then select this scope of expert users to filter or search for other activity entities.

In an embodiment, a user can search or browse a set of data entities, such as activity entities. The set of data entities may be arranged by default according to a ranking criteria based on relevance to a search query or strength of association with one or more metadata elements. Upon specifying a scope of users, an embodiment of the system will rank the set of data entities, or a selected portion thereof, according to the ratings or metadata associations of the scope of users, rather than the entire set of users. The data entities ranked according to the scope of users may then be presented to a user.

Advertisers are reluctant to purchase advertising shown in conjunction with user-generated content, because the user-generated content on the same page as the advertisement may be offensive or disparage their product or brand. To overcome this reluctance, some social media networking web sites use humans to review and approve user-generated content as safe for advertising.

In an embodiment, content on the social media networking service is partitioned into a brand-safe zone, which includes advertisements, and an unbranded zone. The content in the brand-safe zone has been reviewed and determined to be acceptable with the policies of advertisers. The unbranded zone does not include any advertisements, or only advertisements from advertisers that are not concerned about user-generated content. Typically, the unbranded zone includes less popular user-generated content, such as expressions that have not received positive recognition (or have received negative recognition). When users access activity entities using a discovery application, the initial presentation of an activity will include content and advertisements from the brand-safe zone. This may include a description of the activity as well as a selection of highly rated expressions that have been reviewed and added to the brand-safe zone. If the user has further interest in the activity and its expressions, the user may view additional web pages of expressions associated with the activity.

When the user begins to view less popular expressions, the social media networking web site may transition its presentation to the user of the activity to the unbranded zone. Within this zone, users can view less highly rated expressions that have not been reviewed for compliance with advertiser guidelines. Because this user-generated content has not been reviewed, the advertising in the unbranded zone has been reduced or eliminated.

Figure 7:
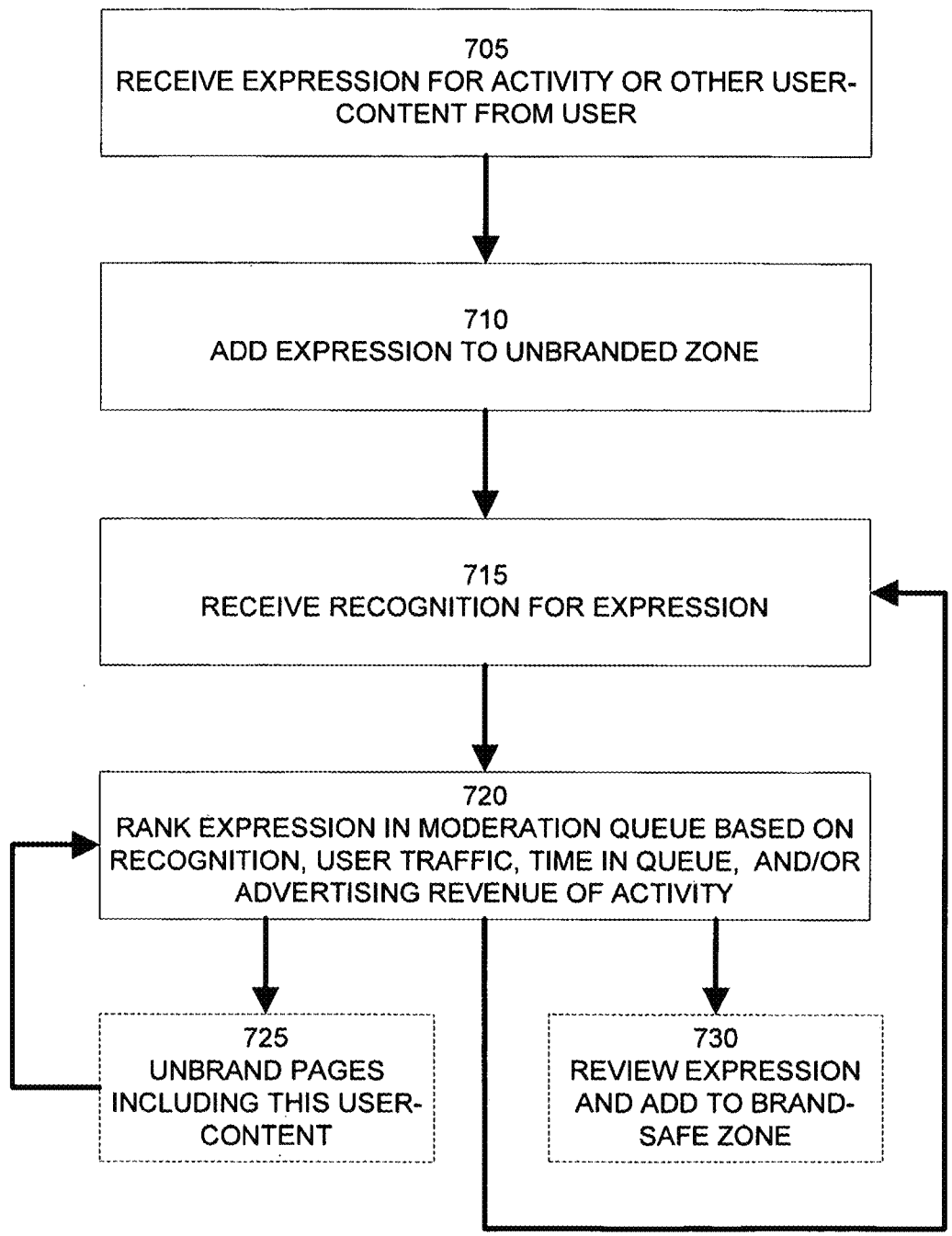
FIG. 7 illustrates a method of efficiently selecting user-generated content for review according to an embodiment of the invention.

Because the content of the social media networking service has been partitioned into a brand-safe and an unbranded zone, it is desirable to ensure that the most popular content is reviewed and added to the brand-safe zone as quickly as possible to maximize advertising revenue. FIG. 7 illustrates a method 700 of efficiently selecting user-generated content for review according to an embodiment of the invention.

After receiving an expression or other user-generated content in step 705, such as a user-defined activity or list of activity entities, step 710 of method 700 adds the content to an unbranded zone or portion of the social media networking service. In step 715, method 700 determined if the content has received sufficient positive expression recognition. If so, then step 720 will rank the expression in a moderation queue based on its quantity and type of recognition, amount of user traffic, time in the moderation queue, the advertising revenue associated with the activity, and/or the rate of change of any of these factors. The moderation queue determines the order in which user-generated content is reviewed for compliance with advertiser policies. The ranking is the result of an optimization that balances maximizing advertising revenue with ensuring that the most-popular, topical, and/or noteworthy user-generated content is prominently featured.

Based on the ranking of the user-generated content, the method 700 may either wait until the user-generated content is reviewed in step 730 and added to the brand-safe zone or if the user-generated content is exceedingly popular, the method 700 in step 725 may debrand or move the main page of the activity to the unbranded zone. Although step 725 results in a short-term loss of advertising revenue, it ensures that popular and/or noteworthy user-generated content is prominently featured. Over the long term, this enhances the reputation of the social media networking service as a source for interesting, relevant, and topical content and increases user loyalty and traffic.

If the activity is debranded in step 725, the ranking in the moderation queue of the user-generated content that triggered this action is modified to reflect the loss of advertising revenue from the debranding. This typically increases the rank of the user-generated content substantially. Similarly, if user-generated content waiting in the moderation queue receives additional recognition or substantial user traffic, the ranking of this user-generated content by step 720 is adjusted accordingly.

Eventually, all content in the moderation queue will either be reviewed and potentially added to the brand-safe zone, reviewed and rejected from the brand-safe zone due to its content, or drop off of the moderation queue without being reviewed due to fading popularity. User-generated content that does not become popular can remain in the unbranded zone, as the cost of reviewing this content is not justified by the marginal increase in advertising revenue.

It should be noted that the prioritization of content to review may be determined by many factors besides user traffic and advertising revenue value. For example, if a given user has been acknowledged as a good photographer (for example by receiving many positive expression recognitions for his posted photographs), then new photographs from this user may be given a higher priority in the moderation queue based on a prediction of heavy user traffic.

In further embodiments, the social networking service can include zones of varying degrees of brand-safety. For example, there may be an unbranded zone, which does not include any limits on user-generated content, one or more intermediate zones, such as a profanity-free zone that includes user-content automatically screened for profanity and offensive language, and a brand-safe zone, which only includes user-content screened by human reviewers. Each intermediate zone can include a different levels of automated screening or other safeguards against potentially offensive user-generated content. In these embodiments, some advertisers may be willing to advertise in the less brand-safe intermediate zones, while other may only purchase advertisements in the brand-safe zone.

As described above, user profiles, activity entities, and expressions may be associated with metadata elements to assist in searching and navigation. Metadata elements can be added by users, administrators of the social media networking service, or advertisers, who may be charged for the ability to add metadata elements. Associating users, activity entities, and expressions with metadata is time consuming and error-prone. For example, if a social media networking service includes hundreds of thousands of activity entities and users, it is impractical for the service administrators to manually associate metadata with users and activity entities. Automated metadata associating techniques using semantic analysis are complicated, error-prone, and unable to provide more than the most basic metadata associations. Many users are reluctant to spend the time to associate metadata elements with themselves, other users, activity entities, or expressions. Moreover, users that are willing to manually add metadata associations often use inconsistent or inaccurate metadata elements, limiting the usefulness of the metadata.

Figure 8:
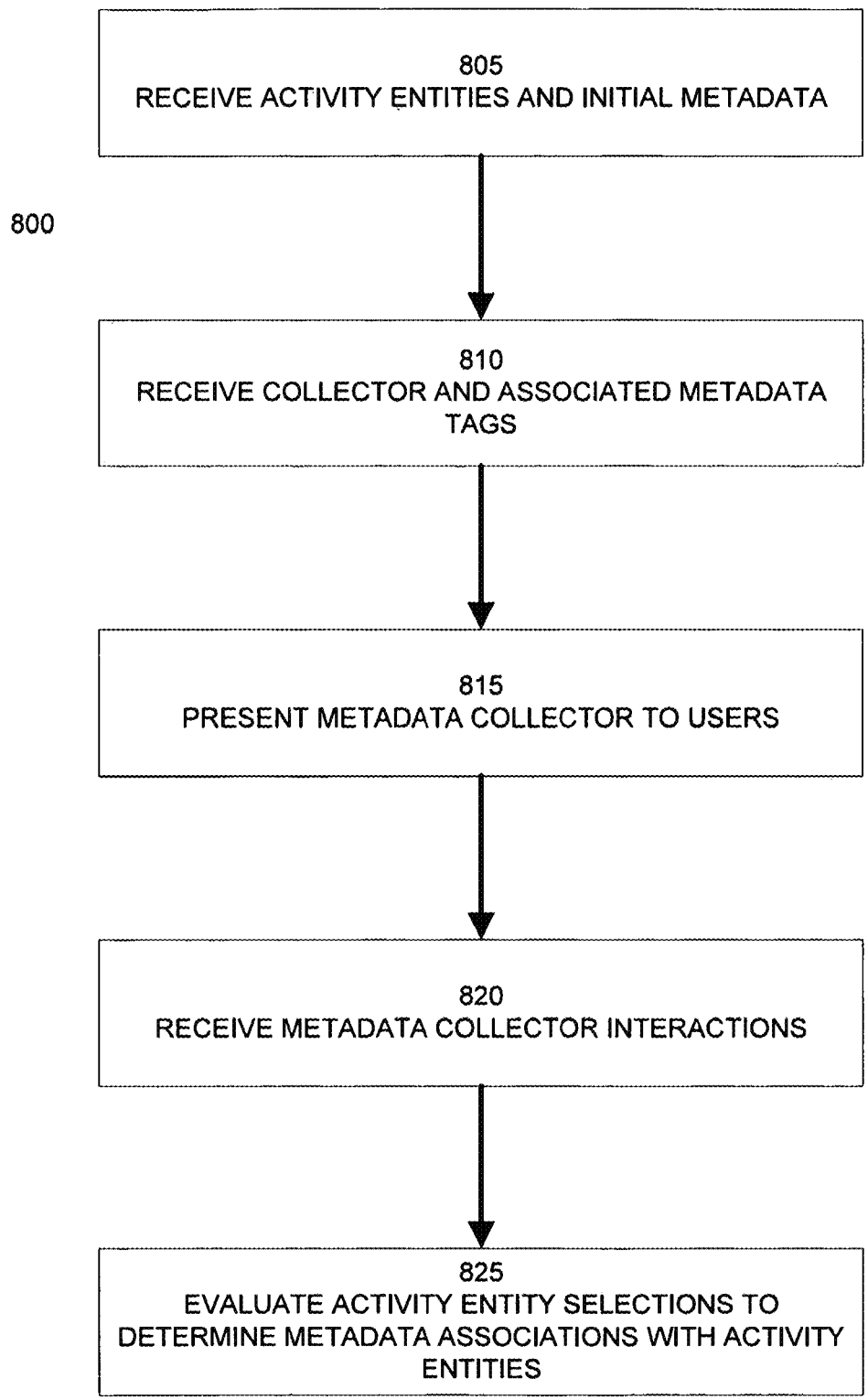
FIG. 8 illustrates a method for implicitly associating metadata with data entities according to an embodiment of the invention.

An embodiment of the invention compensates for these problems by collecting and implicitly associating metadata with user profiles, activity entities, expressions, or other data entities based on user behavior. FIG. 8 illustrates a method 800 for implicitly associating metadata with data entities according to an embodiment of the invention.

Step 805 of method 800 receives a set of one or more activity entities or other data entities, such as expressions, to be associated with metadata. In an embodiment, the set of activity entities may already be associated with initial metadata. This initial metadata may be much coarser and less specific than the type of metadata desired by the social media networking service.

Step 810 receives a metadata collector and one or more associated metadata elements. A metadata collector is a poll, survey, list, questionnaire, census, test, game, or other type of presentation adapted to solicit user interaction. In an embodiment, a metadata collector is associated with one or more metadata elements. As explained below, when users interact with a metadata collector, their user profiles and the data entities included in their interactions become associated with the metadata elements of the metadata collector.

For example, a metadata collectors can include lists or surveys that ask users to submit activity entities. Examples of these types of metadata collectors may include surveys on "Best Hamburger in the San Francisco," which is associated with metadata elements such as San Francisco geography, food and drink, hamburgers, and restaurants; "Best Places to Take Your Pet in the San Francisco," which is associated with metadata such as San Francisco geography, and pets; "Best margaritas in the Mission neighborhood in San Francisco," which is associated with metadata such as San Francisco geography, food and drink, bars, restaurants, and cocktails; and "Dog Friendly Napa Valley," which is associated with metadata such as Napa Valley geography, pets, dogs, hotels, food and drink, wineries, bars, and restaurants. Other examples of metadata entities associated with activity entities can include map coordinates or addresses and business hours.

Step 815 presents a metadata collector to a user. Embodiments of step 815 may present metadata collectors within any of the applications described above or using an additional metadata collection application.

Some or all of the users viewing or otherwise perceiving a metadata collector may choose to interact with the metadata collection. In an embodiment, users may interact with a metadata collector by adding an activity entity, rate activity entities added by other users to the metadata collector, or otherwise interact with a previously added activity entity, for example by indicating that they have completed or would like to complete the activity defined by the activity entity.

Step 820 receives the user interactions with the metadata collector. Based on the types and quantity of interactions, step 825 associates the metadata elements associated with the metadata collector with some or all of the users, activity entities, and/or other data entities included in the user interactions with the metadata collector.

For example, if a user adds a park activity entity to the survey metadata collector "Best Places to Take Your Pet in the San Francisco," this park activity entity may be associated with the metadata elements San Francisco geography and pets. Additionally, the user adding this park activity entity may also be associated with these metadata elements San Francisco geography and pets. Furthermore, subsequent users that favorably rate this park activity entity in the survey metadata collector may also be associated with these metadata elements San Francisco geography and pets. The users and activity entities associated with these metadata elements may then be accessed via their metadata elements, independently of the metadata collector.

In an embodiment, step 825 may employ various algorithms or heuristics to determine when a user, activity entity, expression, or other data entity inherits or is assigned a metadata element from an associated metadata collector. For example, any activity entity added to a metadata collector may automatically inherit the metadata elements associated with the metadata collector. In another example, a number of users may have to favorably rate the activity entity before it inherits metadata elements from a metadata collector. In still a further example, a weighting scheme based on the reputations or expertise of the user adding an activity entity, the reputations or expertise of users rating the activity entity, the number of users rating the activity entity, and/or the type of metadata element may be used to determine whether the activity entity inherits metadata elements from the metadata collector.

In yet another example, data entities such as user profiles and activity entities have weighted associations with metadata elements from metadata collectors. The data entities' weighted associations with metadata elements are modified based on factors including the reputations or expertise of the users adding an activity entity, the reputations or expertise of users rating the activity entity, the ratings assigned by users to activity entities, the number of users rating the activity entity, and/or the type of metadata element.

In an embodiment, users may provide positive weightings, increasing the association between a data entity and a metadata element, or a negative weighting, decreasing or potentially eliminating the association between a data entity and a metadata element. For example, a user may rate an activity entity poorly with respect to a metadata collector, indicating that this activity entity does not match a metadata collector and should not be assigned metadata elements from this metadata collector. For example, an activity entity associated with a corner hot dog stand may not belong in a metadata collector for "fine French dining" By allowing users to implicitly or explicitly provide negative association weightings, accidental or malicious misassociation of metadata elements is prevented.

When the weighted association with a metadata element reaches a threshold or satisfies some other criteria, the system considers the data entity to be fully associated and accessible via the metadata element. Otherwise, the metadata element is considered unassociated or weakly associated with the data entity. In an embodiment, the factors and criteria used to evaluate user activity and determine metadata element associations may be specified globally by the system and/or locally in association with a metadata collector or a data entity. For example, a metadata collector may include some or all of the criteria and factors used to assign metadata elements. In another example, a data entity, such as an activity entity or metadata element, may include some or all of the criteria and factors used to assign metadata elements.

In another example, metadata collectors may cumulatively modify the association weight of a metadata element with a data entity. For example, if a user adds a first activity entity to a first metadata collector associated with a "San Francisco" metadata element, the user's profile may be weakly associated with this metadata element. If the user later adds another activity entity to the same metadata collector or a different metadata collector also associated with this "San Francisco" metadata element, the user profile's weighted association with this metadata element will be strengthened.

Embodiments of the invention that implicitly associate metadata with data entities according to user behavior encourage user participation by providing an outlet for self-expression. This allows metadata elements to be generated by users that would never directly create content or manually associate data entities with metadata elements. Moreover, because embodiments of the invention allow system administrators to specify metadata collectors, associated metadata elements, and metadata element association factors and criteria, metadata associations are more consistent than metadata elements directly assigned by users. Furthermore, system administrators can use metadata collectors to gather specific types of metadata. For example, metadata collectors can be created to gather metadata in areas of interest to advertisers.

Figure 9:
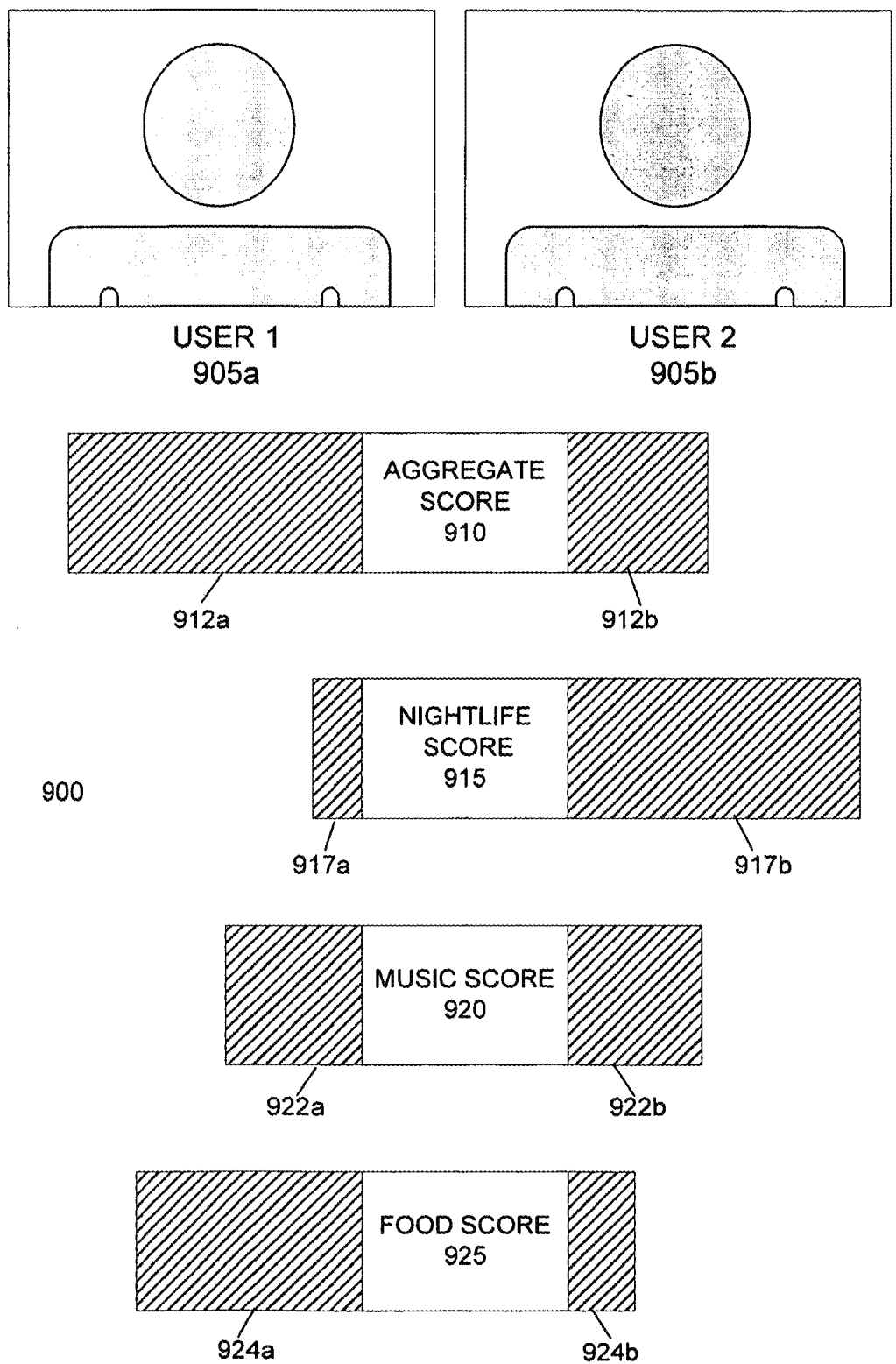
FIG. 9 illustrates an example indicator comparing user interests according to an embodiment of the invention.

As described above, discovery applications enable users to identify users sharing similar interests. FIG. 9 illustrates an example indicator 900 comparing user interests according to an embodiment of the invention. Indicator 900 presents a view or icon representing two user profiles 905*a* and 905*b*. Below each of the user icons 905, a bar graph or other indicator represents a user's score in that area or category, relative to the other user. For example, indicator 900 includes an aggregate score category 910. Users 905*a* and 905*b* relative scores in this category are represented by indicators 912*a* and 912*b*, respectively.

Additionally, indicator 900 includes a nightlife score category 915. Users 905*a* and 905*b* relative scores in this category are represented by indicators 917*a* and 917*b*, respectively. Indicator 900 includes a music score category

920. Users 905*a* and 905*b* relative scores in this category are represented by indicators 922*a* and 922*b*, respectively. Indicator 900 includes a food score category 925. Users 905*a* and 905*b* relative scores in this category are represented by indicators 927*a* and 927*b*, respectively.

Figure 10:
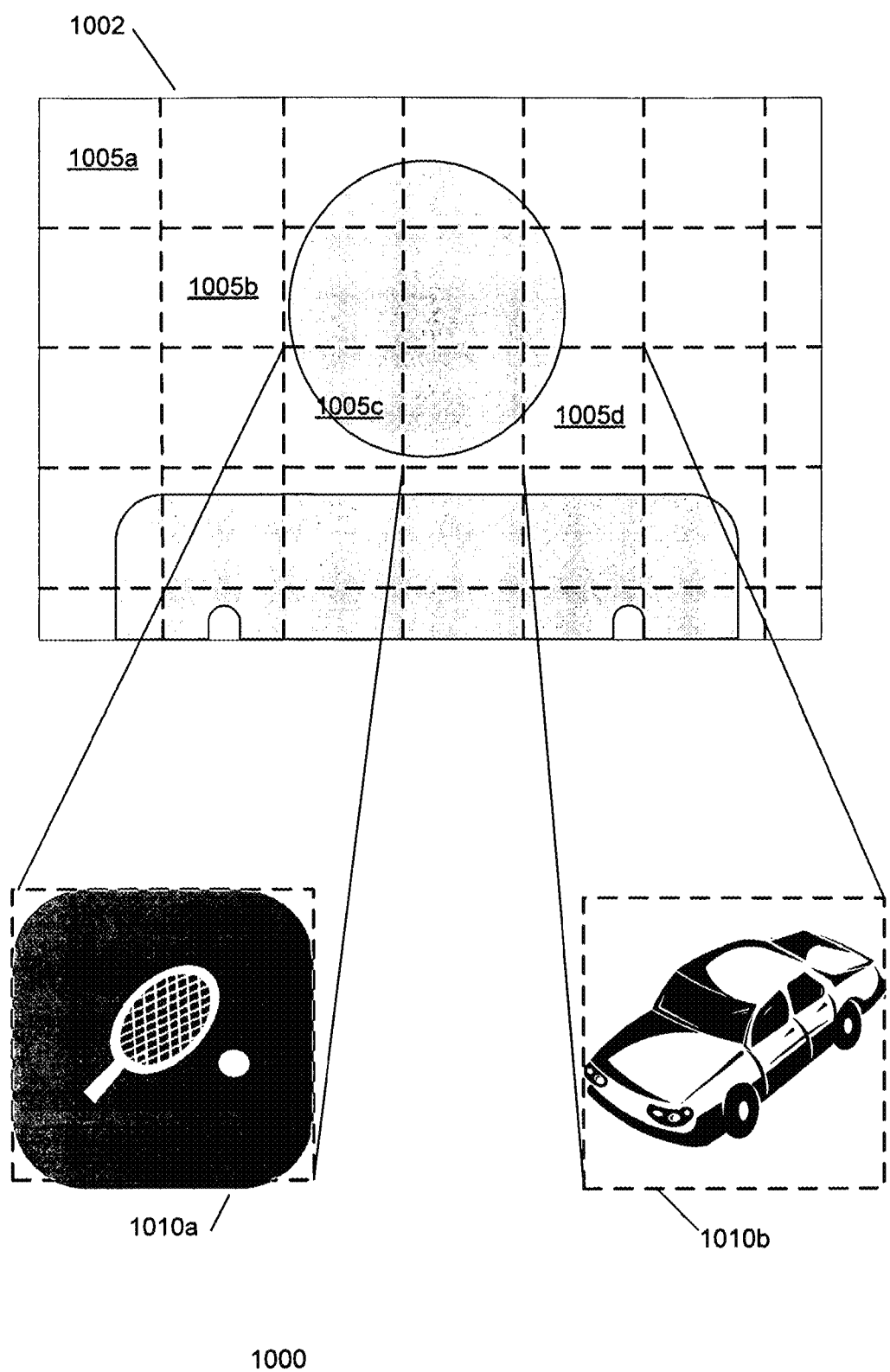
FIG. 10 illustrates an example identity mosaic badge illustrating user interests according to an embodiment of the invention.

FIG. 10 illustrates an example identity mosaic badge 1000 illustrating user interests according to an embodiment of the invention. Identity mosaic badge 1000 presents user interests in the form of a photographic mosaic. A photographic mosaic is created from a primary image that has been partitioned into a number of sections. The average color or other image characteristics of each section of the primary image is matched with a sub-image. The photographic mosaic replaces each image section of a primary image with its matching sub-image. When viewed from a distance or at low magnification, each sub-image in the photographic mosaic appears to be equivalent to a pixel in the primary image. Thus, from a distance, the primary image is apparent to users. At close distances or high magnification, the contents of sub-images are easily discernable.

Identity mosaic badge 1000 includes a primary image 1002. Primary image 1002 may be a user profile photograph or image provided or selected by a user, or any other image or photograph associated with a user profile. In this example, primary image 1002 is partitioned into a plurality of image sections 1005, including image sections 1005*a*, 1005*b*, 1005*c*, and 1005*d*. Image sections 1005 may be the same size and shape or different sizes and/or shapes.

In an embodiment, at least a portion of the image sections 1005 are associated with a sub-image representing a user interest. For example, image section 1005*c* is associated with sub-image 1010*a* representing an interest in tennis and image section 1005*d* is associated with a sub-image 1010*b* representing an interest in cars. In this embodiment, sub-images are associated with image sections based on similarities in color or other image characteristics, such that the set of sub-images forms a photographic mosaic of the primary image 1002.

An embodiment of the system generates the identity mosaic badge automatically or semi-automatically. In this embodiment, a pool of candidate sub-images is identified by searching for images with metadata elements matching or related to metadata elements associated with the user's profile. In a further embodiment, user's may add or exclude metadata elements or specific images from the pool of candidate sub-images.

After the pool of candidate sub-images is identified, a photographic mosaic is created from all or a portion of the pool of candidate sub-images using any photographic mosaic technique known in the art. Example photographic mosaic techniques are described in U.S. Pat. No. 6,137,498, issued to Silvers on Oct. 24, 2000; and in the open-source software application Metapixel, both of which are incorporated by reference herein.

The resulting photographic mosaic forms an identity mosaic badge. In an embodiment, the identity mosaic badge 1000 is interactive. Users may zoom into all or a portion of the identity mosaic badge 1000 to view individual sub-images in detail or zoom out to view the photographic mosaic representing the primary image. In a further embodiment, users may select a sub-image in an identity mosaic badge 1000 to learn about the user interest or activities associated with this sub-image. In this embodiment, a sub-image is associated with one or more metadata elements, derived from the metadata elements used to select this sub-image as a candidate sub-image. Selecting a sub-image retrieves data entities associated with this metadata and optionally further associated with the user profile. This interactive view of the identity mosaic badge 1000 allows other users to learn about another user's interests and accomplishments. It also lets other users learn more about activities.

Figure 11:
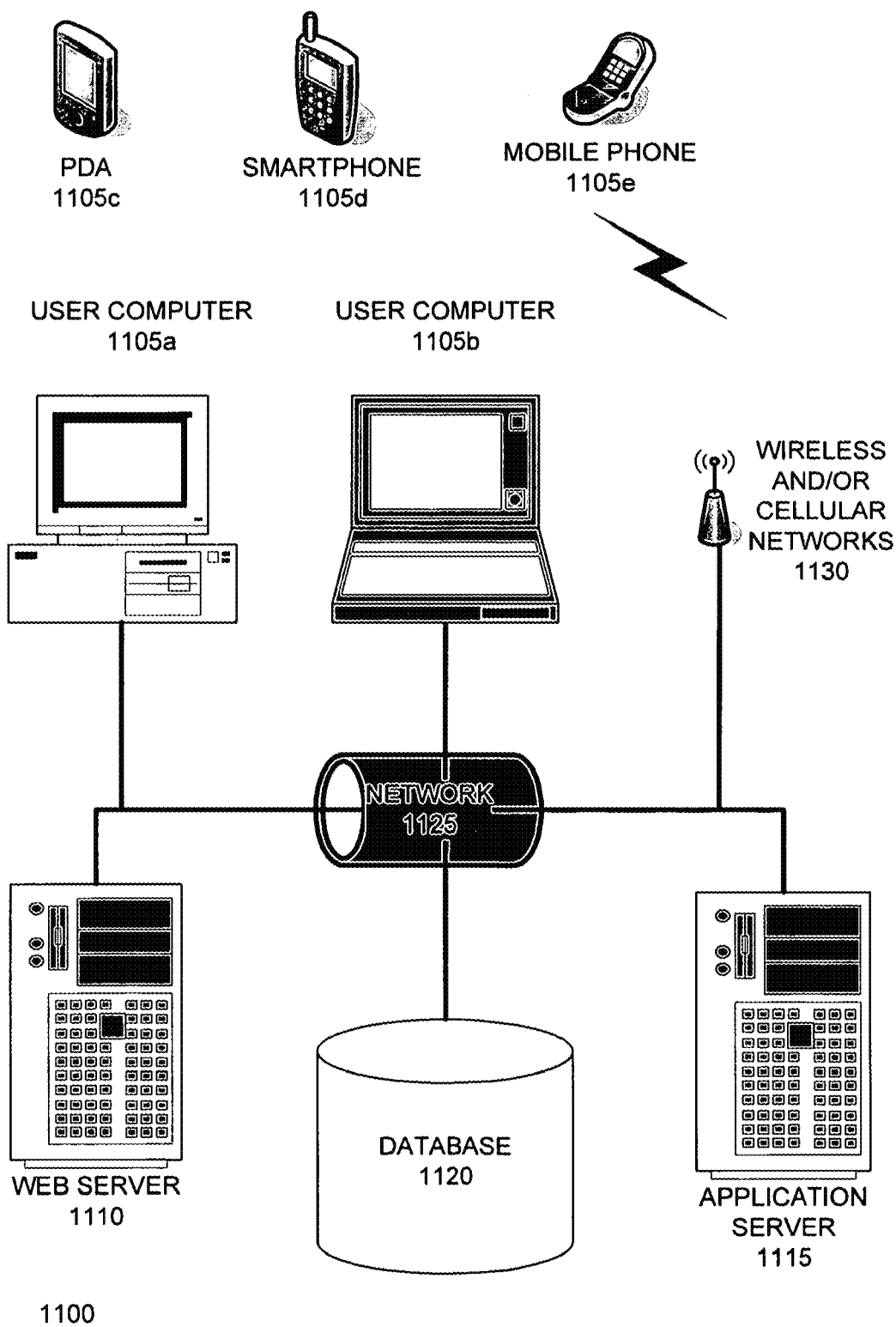
FIG. 11 illustrates an example system architecture suitable for implementing an embodiment of the invention.

FIG. 11 illustrates an example system architecture 1100 suitable for implementing an embodiment of the invention. The system 1100 includes user computers 1105 including portable and desktop personal computers 1105*a* and 1105*b*, personal digital assistants 1105*c*, smartphones 1105*d*, and mobile phones 1105*e*. The system 1100 can interface with any type of electronic device, such as a thin-client computer, Internet-enabled mobile telephone, mobile Internet access device, electronic book, or personal digital assistant, capable of displaying and navigating web pages or other types of electronic documents. Although system 1100 is shown with five user computers, any number of user computers can be supported.

A web server 1110 is used to process requests from web browsers and standalone applications for web pages, electronic documents, social media networking service content, and other data from the user computers. The web server 1110 may also provide syndicated content, such as RSS or Atom feeds, of data related to user profiles, bookmarked activity entities, completed activity entities, expressions, expression recognitions, badges, leaderboards, group discussions, user communications, or any other content of the social media networking service.

Application server 1115 operates one or more data applications. The data applications can be implemented as one or more scripts or programs written in any programming language, such as Java, C, C++, C#, or any scripting language, such as JavaScript or ECMAScript, Perl, PHP, Python, Ruby, or TCL. Data applications can be built using libraries or application frameworks, such as Rails or .NET.

The data applications on application server 1115 process input data and user computer requests and can store or retrieve data from database 1120. Database 1120 stores data created and used by the enterprise. In an embodiment, the database 1120 is a relational database, such as MySQL, that is adapted to store, update, and retrieve data in response to SQL format commands.

In an embodiment, the application server 1115 is one or more general purpose computers capable of executing programs or scripts. In an embodiment, the web server 1110 is implemented as an application running on one or more general purpose computers. The web server 1110 and application server 1115 may be combined and executed on the same computers.

An electronic communication network 1125 enables communication between user computers 1105, web server 1110, application server 1115, and database 1120. In an embodiment, network 1125 may further include any form of electrical or optical communication devices, including wireless 1130 and wired networks. Network 1125 may also incorporate one or more local-area networks, such as an Ethernet network; wide-area networks, such as the Internet and cellular carrier data networks; and virtual networks, such as a virtual private network.

The system 1100 is one example for executing data applications according to an embodiment of the invention. In another embodiment, application server 1115, web server 1110, and optionally database 1120 can be combined into a single server computer application in system 1100. In alternate embodiment, all or a portion of the web server 1110 and application 1115 functions may be integrated into an application running on each of the user computers 1105. For example, a JavaScript application on the user computer 1105 may be used to retrieve or analyze data and display portions of the applications.

Figure 12:
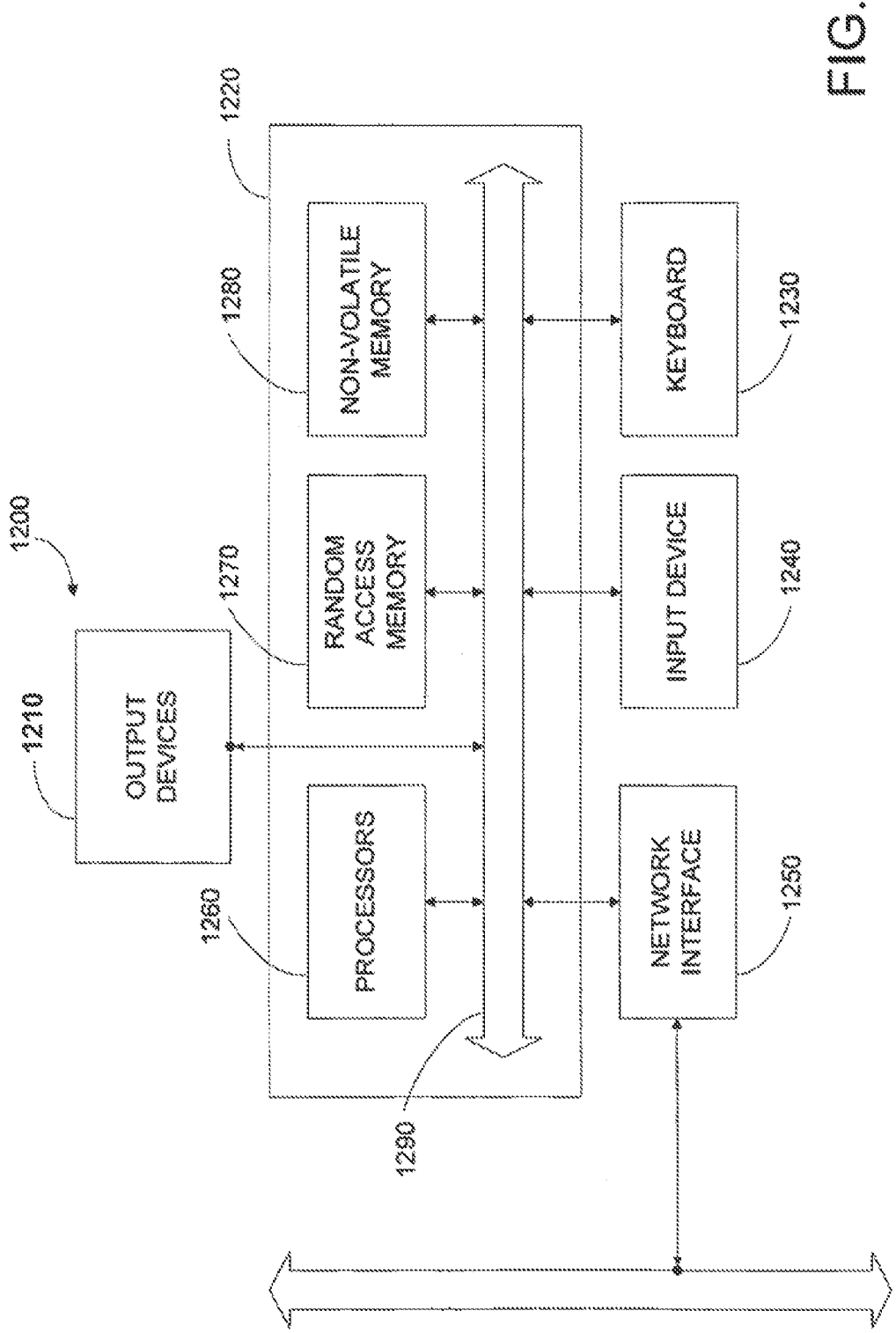
FIG. 12 illustrates an example computer system suitable for use with an embodiment of the invention.

FIG. 12 illustrates an example computer system suitable for use with an embodiment of the invention. Computer system 1200 typically includes one or more output devices 1210, including display devices such as a CRT, LCD, OLED, LED, gas plasma, electronic ink, or other types of displays, speakers and other audio output devices; and haptic output devices such as vibrating actuators; computer 1220; a keyboard 1230; input devices 1240; and a network interface 1250. Input devices 1240 can include a computer mouse, a trackball, joystick, track pad, graphics tablet, touch screen, microphone, various sensors, and/or other wired or wireless input devices that allow a user or the environment to interact with computer system 1200. Embodiments of network interface 1250 typically provides wired or wireless communication with an electronic communications network, such as a local area network, a wide area network, for example the Internet, and/or virtual networks, for example a virtual private network (VPN). Network interface 1250 can implement one or more wired or wireless networking technologies, including Ethernet, one or more of the 802.11 standards, Bluetooth, and ultra-wideband networking technologies.

Computer 1220 typically includes components such as one or more general purpose processors 1260, and memory storage devices, such as a random access memory (RAM) 1270 and non-volatile memory 1280. Non-volatile memory 1280 can include floppy disks; fixed or removable hard disks; optical storage media such as DVD-ROM, CD-ROM, and bar codes; non-volatile semiconductor memory devices such as flash memories; read-only-memories (ROMS); battery-backed volatile memories; paper or other printing mediums; and networked storage devices. System bus 1290 interconnects the above components. Processors 1260 can include embodiments of the above described processors, such as processors 100, 150, and 400.

RAM 1270 and non-volatile memory 1280 are examples of tangible media for storage of data, audio/video files, computer programs, applet interpreters or compilers, virtual machines, and embodiments of the herein described invention.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of identifying a data entity potentially satisfying a user preference, the method comprising:
   receiving data entities including first associations with a first user profiles subset and a second user profiles subset of a set of user profiles;
   receiving a first user profile including second associations with the first user profiles subset and the second user profiles subset;
   selecting at least a portion of the data entities;
   determining a first ranking of the portion of the data entities based on the associations of the portion of the data entities with the first user profiles subset, wherein determining the first ranking of the portion of the data entities comprises ranking the portion of the data entities based at least in part on user reputations associated with the first user profiles subset; and
   generating a presentation of the portion of the data entities, wherein the presentation arranges the portion of the data entities according to the first ranking.

2. The method of claim 1, wherein selecting the portion of the data entities comprises:
   generating a search query; and
   searching the data entities using the search query to identify the portion of the data entities, wherein the portion of the data entities matches the search query.

3. The method of claim 2, wherein generating the search query is performed in response to receiving a search term from a user.

4. The method of claim 2, wherein generating the search query is performed in conjunction with generating a presentation of the first user profile.

5. The method of claim 1, wherein the user profiles of the first user profiles subset are associated with the first user profile via social network relationships.

6. The method of claim 1, wherein receiving the first user profile including the second associations with the first user profiles subset comprises:
   receiving a user scope specification from a user; and
   determining the first user profiles subset from the set of user profiles using the user scope specification.

7. The method of claim 1, wherein the first associations include indications of preferences for the data entities by the first user profiles subset and the second user profiles subset.

8. The method of claim 1, wherein the data entities are selected from one or more of an activity entity, a user profile, an expression, an expression recognition, or a discussion.

9. An apparatus, the apparatus comprising at least one processor and a memory, the memory storing computer program code that, when executed by the at least one processor, causes the apparatus to:
   receive data entities including first associations with a first user profiles subset and a second user profiles subset of a set of user profiles;
   receive a first user profile including second associations with the first user profiles subset;
   select at least a portion of the data entities;
   determine a first ranking of the portion of the data entities based on the associations of the portion of the data entities with the first user profiles subset, wherein determining the first ranking of the portion of the data entities comprises ranking the portion of the data entities based at least in part on user reputations associated with the first user profiles subset; and
   generate a presentation of the portion of the data entities, wherein the presentation arranges the portion of the data entities according to the first ranking.

10. The apparatus of claim 9, wherein selecting the portion of the data entities comprises:
    generating a search query; and
    searching the data entities using the search query to identify the portion of the data entities, wherein the portion of the data entities matches the search query.

11. The apparatus of claim 10, wherein generating the search query is performed in response to receiving a search term from a user or in conjunction with generating a presentation of the first user profile.

12. The apparatus of claim 9, wherein the user profiles of the first user profiles subset are associated with the first user profile via social network relationships.

13. The apparatus of claim 9, wherein receiving the first user profile including the second associations with the first user profiles subset comprises:
receiving a user scope specification from a user; and
determining the first user profiles subset from the set of user profiles using the user scope specification.

14. The apparatus of claim 9, wherein the first associations include indications of preferences for the data entities by the first user profiles subset and the second user profiles subset.

15. The apparatus of claim 9, wherein the data entities are selected from one or more of an activity entity, a user profile, an expression, an expression recognition, or a discussion.

16. At least one non-transitory computer-readable storage medium, the at least one non-transitory computer-readable storage medium having computer coded instructions configured to, when executed by at least one processor:
receive data entities including first associations with a first user profiles subset and a second user profiles subset of a set of user profiles;
receive a first user profile including second associations with the first user profiles subset;
select at least a portion of the data entities;
determine a first ranking of the portion of the data entities based on the associations of the portion of the data entities with the first user profiles subset, wherein determining the first ranking of the portion of the data entities comprises ranking the portion of the data entities based at least in part on user reputations associated with the first user profiles subset; and
generate a presentation of the portion of the data entities, wherein the presentation arranges the portion of the data entities according to the first ranking.

17. The at least one non-transitory computer-readable storage medium of claim 16, wherein selecting the portion of the data entities comprises:
generating a search query; and
searching the data entities using the search query to identify the portion of the data entities, wherein the portion of the data entities matches the search query.

18. The at least one non-transitory computer-readable storage medium of claim 17, wherein generating the search query is performed in response to receiving a search term from a user or in conjunction with generating a presentation of the first user profile.

19. The at least one non-transitory computer-readable storage medium of claim 16, wherein the user profiles of the first user profiles subset are associated with the first user profile via social network relationships.

20. The at least one non-transitory computer-readable storage medium of claim 16, wherein the first associations include indications of preferences for the data entities by the first user profiles subset and the second user profiles subset.

* * * * *